US012176973B2

(12) United States Patent
Zheng et al.

(10) Patent No.: US 12,176,973 B2
(45) Date of Patent: *Dec. 24, 2024

(54) TECHNOLOGIES FOR ACOUSTIC MULTIPLE-INPUT MULTIPLE-OUTPUT (MIMO) TRANSMISSION THROUGH A SERIAL PERIPHERAL INTERFACE (SPI) BUS

(71) Applicant: Lehigh University, Bethlehem, PA (US)

(72) Inventors: Yahong Rosa Zheng, Bethlehem, PA (US); Xiyuan Zhu, Bethlehem, PA (US)

(73) Assignee: Lehigh University

( * ) Notice: Subject to any disclaimer, the term of this patent is extended or adjusted under 35 U.S.C. 154(b) by 0 days.

This patent is subject to a terminal disclaimer.

(21) Appl. No.: 18/143,839

(22) Filed: May 5, 2023

(65) Prior Publication Data

US 2024/0162942 A1  May 16, 2024

Related U.S. Application Data

(63) Continuation of application No. 17/745,019, filed on May 16, 2022, now Pat. No. 12,009,886.

(51) Int. Cl.
*H04B 7/0413* (2017.01)
*H04L 27/20* (2006.01)

(52) U.S. Cl.
CPC ........... *H04B 7/0413* (2013.01); *H04L 27/20* (2013.01)

(58) Field of Classification Search
CPC .............................. H04B 7/0413; H04L 27/20
See application file for complete search history.

(56) References Cited

U.S. PATENT DOCUMENTS 10,101,429 B2 * 10/2018 Deng .................... A61B 5/1112

OTHER PUBLICATIONS

Campagnaro et al., "On the Feasibility of Video Streaming through Underwater Acoustic Links" Authorized licensed use limited to: Lehigh University. Downloaded on May 15, 2022 at 23:06:23 UTC from IEEE Xplore, pp. 1-5.

(Continued)

*Primary Examiner* — Isam A Alsomiri
*Assistant Examiner* — Abdallah Abulaban
(74) *Attorney, Agent, or Firm* — The Belles Group, P.C.

(57) ABSTRACT

An acoustic transmission device may communicate sensing data via one or more multiple-input multiple-output (MIMO) transmissions. The device may comprise a serial peripheral interface (SPI) and/or a phase shifting key (PSK) modulator. The device may be configured to provide a first SPI signal, perhaps including one or more coded information bits, to the PSK modulator. The device may provide a second SPI signal, perhaps including a synchronous clock signal, to the PSK modulator. The device may generate of one or more symbols on N transmit branches based on the first SPI signal. The device may generate of at least one carrier frequency with one or more phases to form one or more phased carriers based on the second SPI signal. The device may control a transmission of the sensing data (e.g., video) via the one or more symbols on the N transmit branches on the one or more phased carriers.

20 Claims, 33 Drawing Sheets

(56) References Cited

OTHER PUBLICATIONS

Jing et al., "Signal Detection for Underwater IoT Devices With Long and Sparse Channels" IEEE Internet of Things Journal, vol. 7, No. 8, Aug. 2020, Authorized licensed use limited to: Lehigh University, Downloaded on May 15, 2022, pp. 6664-6675.

Zheng et al., "Turbo Equalization for Single-Carrier Underwater Acoustic Communications", IEEE Communications Magazine, vol. 53, No. 11, pp. 79-87, Nov. 2015.

Stojanovic et al., "Underwater Acoustic Communication Channels: Propagation Models and Statistical Characterization", IEEE Communications Magazine, Published: Jan. 2009, pp. 84-89.

Duan et al., "Efficient Adaptive Turbo Equalization for Multiple-Input-Multiple-Output Underwater Acoustic Communications", IEEE Journal of Oceanic Engineering, vol. 43, No. 3, Jul. 2018, Authorized licensed use limited to: Lehigh University. Downloaded on May 15, 2022 at 23:07:51 UTC from IEEE Xplore, pp. 792-804.

Zhu et al., "Video Transmission through Underwater Acoustic Channels" P.C. Rossin College of Engineering and Applied Science, Lehigh University Bethlehem, Pennsylvania, pp. 1-1,1. Abstract submitted to IEEE Ocean's Conference, May 9, 2021.

Texas Instruments "SimpleLink multi-standard CC2650 SensorTag kit reference design" https://www.ti.com/tool/TIDC-CC2650STK-SENSORTAG?HQS=ti-null-null-refdes-refdes-rd-UltraLibrarian-wwe&utm_source=google&utm_medium=cpc&utm_campaign=sdm-indu-null-refdesdynamic_industrial-cpc-rd-google-wwe_int&utm_content=refdesdynamic&ds_k=DYNAMIC+SEARCH+ADS&DCM=yes&gclid=EAIaIQobChMI7_OMqL2n_glVbhKzAB2e8A-6EAAYASAAEgkqkvD_BwE&gclsrc=aw.ds, Accessed: Dec. 20, 2021, pp. 1-6.

Nvidia, "Jetson Orin Nano Developer Kit" https://store.nvidia.com/en-us/jetson/store/?page=1&limit=9&locale=en-us, Accessed: Dec. 20, 2021, pp. 1-1.

Zhu et al. "Video Transmission through Underwater Acoustic Channels", Presented at the Student Design Competition Networked Computing on the Edge at the 2021 CPS IoT Week, May 17, 2021, submitted to IEEE Ocean's conference, May 9, 2021.

* cited by examiner

TECHNOLOGIES FOR ACOUSTIC MULTIPLE-INPUT MULTIPLE-OUTPUT (MIMO) TRANSMISSION THROUGH A SERIAL PERIPHERAL INTERFACE (SPI) BUS

CROSS-REFERENCE TO RELATED APPLICATIONS

This application is a continuation application of U.S. patent application Ser. No. 17/745,019, filed on May 16, 2022, the entire contents of which being incorporated by reference herein, for all purposes.

GOVERNMENT RIGHTS

This invention was made with government support under IIP-1853258 awarded by the National Science Foundation and N0014-19-1-2688 awarded by the Office of Naval Research. The government has certain rights in the invention.

BACKGROUND

The Internet of Things (IoT) generally describes devices and/or groups of devices with sensors, processing ability, software, that connect and exchange data with other devices and systems over the Internet, or other communications networks (that may or might not be connected to the Internet). IoT technologies include embedded systems, machine learning type of artificial intelligence, wireless sensors/sensor networks, control systems, and industrial, commercial, and residential automation.

Multiple-input and multiple-output (MIMO) is a method for multiplying the capacity of a communication (e.g., radio) using multiple transmission and receiving antennas to exploit multiplexing gains. MIMO collectively refers to techniques for sending and receiving more than one data signal, perhaps substantially simultaneously over the same communication bandwidth.

SUMMARY

Technologies are disclosed for an acoustic transmission device that may be configured to communicate sensing data (e.g., data from a sensing device, such as video content from a camera, sonar data, IMU, etc.) via one or more multiple-input multiple-output (MIMO) transmissions. The acoustic transmission device may comprise a memory, a serial peripheral interface (SPI), and/or a phase shifting key (PSK) modulator. The acoustic transmission device may comprise a processor.

The processor may be configured to provide a first SPI signal to at least one MIMO component of the PSK modulator. The first SPI signal may include one or more coded information bits. The processor may be configured to provide a second SPI signal to the PSK modulator. The second SPI signal may be a synchronous clock signal.

The processor may be configured to control a generation of one or more symbols on N transmit branches based, at least in part, on the first SPI signal. The processor may be configured to control a determination of at least one carrier frequency with one or more phases to form one or more phased carriers based, at least in part, on the second SPI signal. The processor may be configured to control a transmission of at least some of the sensing data via the one or more symbols on the N transmit branches on the one or more phased carriers.

Technologies are disclosed for a phase shifting key (PSK) modulator device. The PSK modulator may include one or more multiple-input multiple-output (MIMO) components. The PSK modulator may be in communication with a serial peripheral interface (SPI) and/or a sensing device (e.g., a video streaming device, a Sonar device, etc.). The PSK modulator may comprise a MIMO Bit-to-Symbol (Bit2sym) converter that may be configured to receive a first SPI signal. The first signal may include one or more coded information bits corresponding to at least some sensing data provided by the sensing device. The MIMO Bit2Sym converter may be configured to generate one or more symbols on N transmit branches based, at least in part, on the first SPI signal.

The PSK modulator may comprise a phased carrier generator that may be configured to receive a second SPI signal. The second signal may include a synchronous clock signal. The phased carrier generator may be configured to determine at least one carrier frequency with one or more phases to form one or more phased carriers based, at least in part, on the second SPI signal.

The PSK modulator may comprise a carrier modulator that may be configured to receive the one or more symbols on the N transmit branches from the MIMO Bit2Sym converter. The carrier modulator may be configured to receive the one or more phased carriers from the carrier modulator. The carrier modulator may be configured to send at least some of the sensing data via the one or more symbols on the N transmit branches on the one or more phased carriers.

Technologies are disclosed for one or more techniques/methods that may be performed by an acoustic transmission device that may be configured to communicate sensing data (e.g., video content from a camera, Sonar data, IMU, etc.) via one or more multiple-input multiple-output (MIMO) transmissions. The acoustic transmission device may comprise a memory, a serial peripheral interface (SPI), and/or a phase shifting key (PSK) modulator. One or more methods may comprise providing a first SPI signal to at least one MIMO component of the PSK modulator. The first SPI signal may include one or more coded information bits.

One or more methods may comprise providing a second SPI signal to the PSK modulator. The second SPI signal may include a synchronous clock signal. One or more methods may comprise generating of one or more symbols on N transmit branches based, at least in part, on the first SPI signal.

One or more methods may comprise determining at least one carrier frequency with one or more phases to form one or more phased carriers based, at least in part, on the second SPI signal. One or more methods may comprise transmitting at least some of the sensing data via the one or more symbols on the N transmit branches on the one or more phased carriers.

BRIEF DESCRIPTION OF DRAWINGS

The elements and other features, advantages and disclosures contained herein, and the manner of attaining them, will become apparent and the present disclosure will be better understood by reference to the following description of various examples of the present disclosure taken in conjunction with the accompanying drawings, wherein.

DETAILED DESCRIPTION

Figure 1:
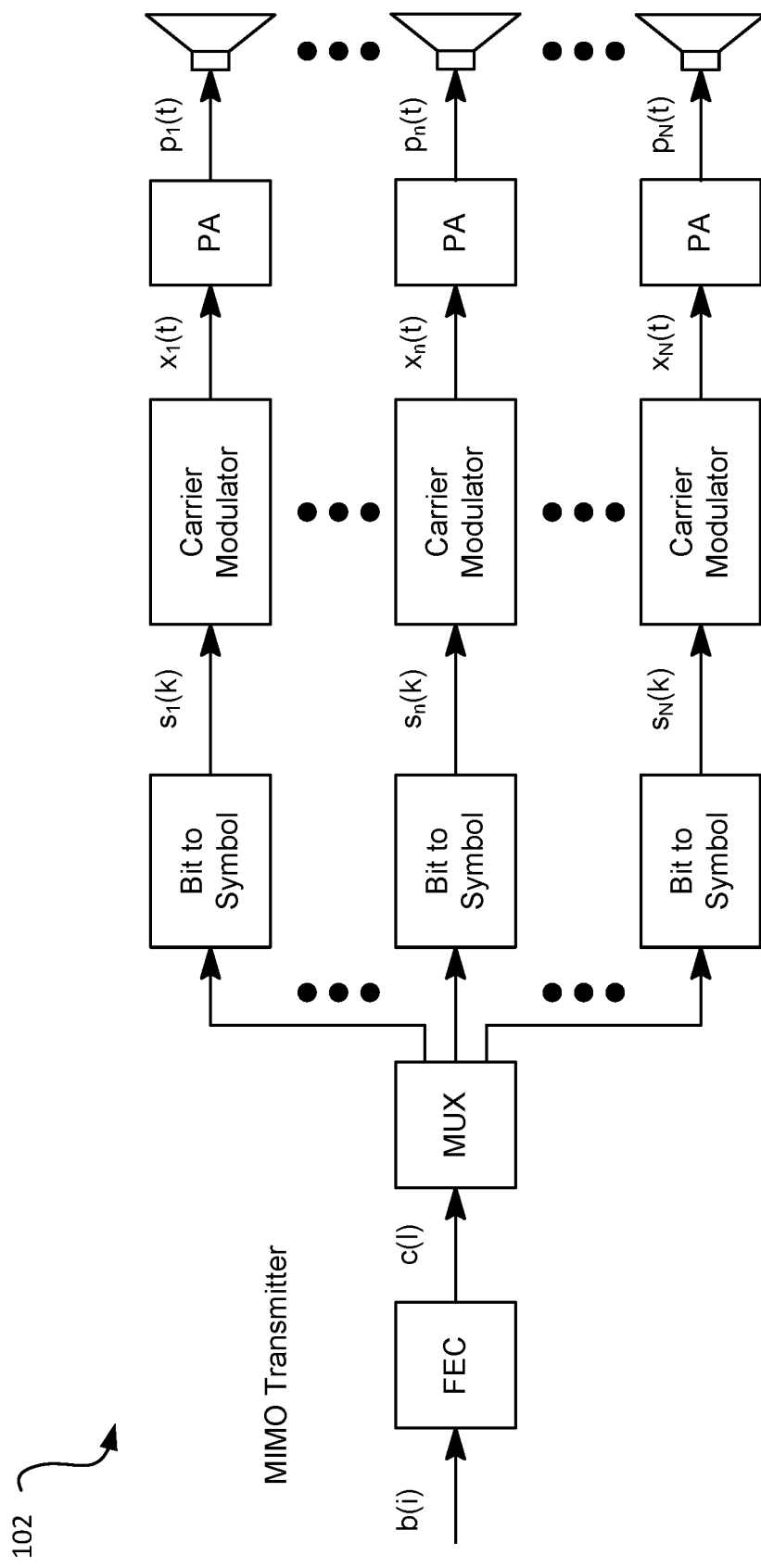
FIG. 1 is a block diagram illustrating an example MIMO transmitter block diagram.

For the purposes of promoting an understanding of the principles of the present disclosure, reference will now be made to the examples illustrated in the drawings, and specific language will be used to describe the same. It will nevertheless be understood that no limitation of the scope of this disclosure is thereby intended.

The technologies described herein may be related with the Internet of Things (IoT) that have advanced over the past ten, or so, years. Many of the IoT devices are low-cost, low-power, and/or small-form-factor sensors and/or actuators with wireless communication capability. The sensors, actuators and/or wireless communication systems on IoT devices may be controlled by a System on a Chip (SoC) built around either a micro-controller (MCU), a microprocessor (CPU), and/or a programmable processor (FPGA). The MCU-based SoC devices may have the advantages of very low cost, very low power consumption in sleep modes, and/or easy control of GPIO (General-purpose Input/Output) ports for sensing, actuation, and/or waveform manipulation. MCU-based systems might encounter difficulties with taking camera input, limited computational capability, and/or requiring special IDE (Integrated Development Environment) for firmware modification, for example. An example of the MCU-based IoT device is the SensorTag CC2650 from Texas Instruments which may integrate an ARM Cortex M3 MCU with the Bluetooth wireless communication technology.

The CPU-based SoC devices may utilize a micro-processor with a sufficient computational capability and/or a lean operating system. Such devices may be user friendly, may readily interface with USB and Ethernet, and/or may be relatively easy to program with one or more high-level languages. CPU-based SoC devices might also be higher power consumption and/or may encounter difficulties in low level interface to sensors and/or controls, perhaps despite that some of the devices provide GPIO ports. Examples of the CPU-based SoC devices include, but are not limited to, Rasbery Pi, BeagleBone, and Jetson. Many of the devices may use the Linux operating system, for example. Nvidia Jetson devices may integrate GPUs with the multi-core CPU in the SoC. The programmable SoC devices may be based on Field Programmable Gate Arrays (FPGA) which may be flexible in software and/or hardware co-design that may provide accurate low-level controls and/or flexible high-level functionalities. Some of the FPGA-based SoC devices may be high power consumption devices, and/or may involve long development cycles. An example of the FPGA-based SoC is the Xilinx PYNQ platform.

Technologies described herein may adopt/use the CPU/GPU-based SoC devices for Underwater IoT (U-IoT) applications. One of the technical limitations (e.g., bottlenecks) for U-IoT systems can be wireless communication through water which may be used (e.g., required) to get access to the Internet via underwater gateways. Unlike the terrestrial wireless communications where Radio Frequency (RF) signals may be effective to communicate, underwater wireless communication may rely (e.g., mostly) on acoustic signals at a few kilo-Hertz to a few hundred kilo-Hertz frequencies. Due to the low carrier frequency and/or small bandwidth, acoustic communication systems may use/rely on multiple transmit and/or multiple receive branches to achieve usable data rates. As described herein, the Multiple-Input Multiple-Output (MIMO) technology may be effective for improving the data rate and/or reliability of underwater acoustic communications.

One or more approaches implementing MIMO transmitters may include MCU, Digital Signal Processors (DSP), and FPGAs as the generating multiple synchronous, modulated signals requires accurate timing control for carrier frequency and phase, symbol duration and delay, and/or packet frame and timing, for example. The hardware platforms may utilize the hardware timers to achieve the control, for example. The MCU, DSP, and/or FPGA devices may encounter difficulties in interfacing camera sensors, and/or may often require long development cycles. CPU- and/or GPU-based SoC devices may be more flexibly adopted for IoT applications, perhaps for example due to their interface capabilities with cameras and their capability of incorporating Artificial Intelligence (AI) algorithms. The GPIO ports of the CPU/GPU-based SoC devices may have difficulties in being accurately controlled. In one or more scenarios, an MCU may be inserted between the SoC and the GPIO. Software drivers may be useful to enable the low-level control from the high-level programming languages. For example, Pixhawk 4 contains an STM32 MCU which can connect to the Raspberry Pi and/or Nvidia Jetson SoCs, and may replace the 40-pin GPIO by its own GPIO ports. Drivers may be useful for the SoC devices and/or Pixhawk 4 to work together and/or achieve accurate timing, analog to digital converter, and/or low-level control of Pulse Width Modulation (PWM).

Technologies described herein may utilize the Serial Peripheral Interface (SPI) bus of the CPU/GPU-based SoC devices to implement one or more MIMO transmitters. One or more (e.g., low-cost) hardware circuits are contemplated and/or designed to implement the single-carrier Phase Shift Keying (PSK) modulated signals for one or more MIMO transmitters. A high-level programming language, such as python for example, may be used to program the SPI bus of the SoC devices and/or may control the proposed devices and/or circuits. Special drivers might not be particularly useful to interface between the high-level language and the low-level control, which may (e.g., significantly) shorten the development cycle.

Technologies described herein can implement one or more MIMO transmitters with a carrier frequency of $f_c=R_{spi}/2^{(q-1)}$ and/or a symbol rate of $f_s=R_{spi}/(N(q+1))$, where $R_{spi}$ is the clock rate of the SPI bus, N is the number of multiple transmit branches (e.g., an integer, a natural number, etc.), and q is the order of M-ary PSK modulation, where $M=2^q$. For example, if the highest SPI clock is 12.8 MHz, the one or more techniques/devices described herein can generate 8-PSK modulated signals at a carrier frequency of 3.2 MHz. For example, if a carrier frequency of 400 kHz may be useful, then one or more techniques/devices described herein can generate 64-PSK modulated signals, perhaps for at least 36 transmit branches at a symbol rate of 50 kbps. One or more techniques/device described herein may include: an ability of generating one or more On-Off keying (OOK) signals, the flexibility of mixing different modulation schemes in a packet frame, inserting accurate time gaps between signal blocks, and/or the flexibility of selecting different numbers of transmit branches.

At least three example circuits/devices described herein based on the technologies described herein may be designed and/or successfully tested with an Nvidia Jetson Xavier NX as the SoC and/or one or more power amplifiers (PA), perhaps as the analog front end. Such circuits may be implemented with low-cost logic circuits/circuit elements such as D-type flip flop, 2-to-1 multiplexer, binary counter, and/or logic invertor, etc. The software control programs may be written in Python, for example, among other languages. Signal packets with OOK, BPSK, QPSK, and 8-PSK signals may be transmitted and/or tested with $f_c=200$ kHz and/or $f_s=25$ kHz for up to 8 transmit branches, among other scenarios. The testing data/results described herein may be understood to demonstrate successful MIMO transmission and reception.

One or more scenarios contemplate single-carrier MIMO transmission. Single carrier MIMO transmission may be used for underwater acoustic wireless communication, perhaps for example due to its high data rate and/or high spectrum-time efficiency. An example block diagram of an N-branch (e.g., three branches are shown) MIMO transmitter 102 is illustrated in FIG. 1. In FIG. 1, the components may be understood as FEC—Forward Error Correction coder, MUX—multiplexer, and PA—power amplifier, for example. The information bits b(i) may be (e.g., first) coded and/or interleaved, then the coded bits c(l) may be multiplexed into N bit streams. One or more, or every, q bits of each stream may be grouped together and/or mapped into at least one symbol $s_n(k)$, for example by the Bit-to-Symbol (Bit2Sym) converter.

The M-ary PSK modulation may have an alphabet of M symbols with M=2q. The symbols may be modulated on to the carrier frequency $f_c$. For one or more, or each, symbol period t=[0, $T_s$), the modulated signal may be represented as $x_n(t)=A\cos(2\pi(f_c t+m/M))$, where m=0: M−1 is the index of the symbol alphabet. Perhaps for example if symbol precoding may be applied, then the amplitude and/or phase of the symbols may be modified by the precoding coefficients, perhaps before being modulated by carrier modulators on to the carrier frequency, among other scenarios. The modulated signals may be fed into the power amplifiers (PA) for transmission.

Figure 2:
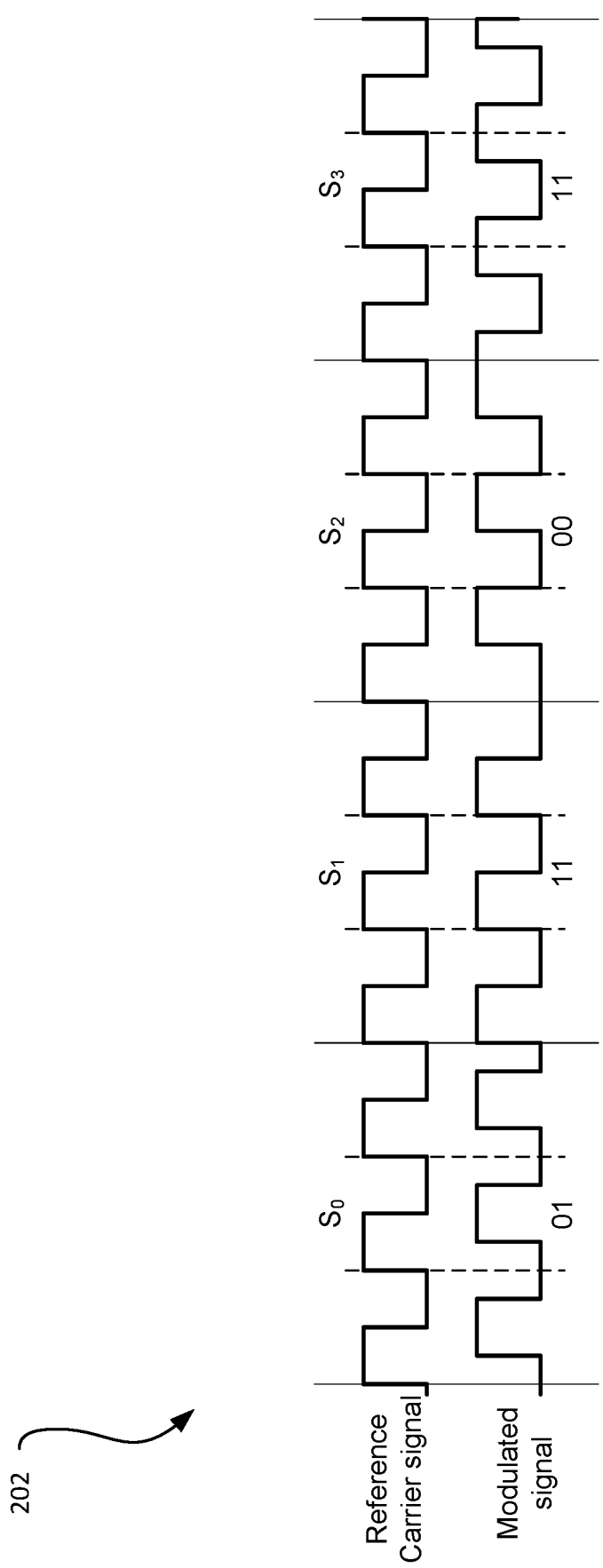
FIG. 2 is an example of a 4PSK signal modulated signal with $f_cT_s=3$.
Figure 5C:
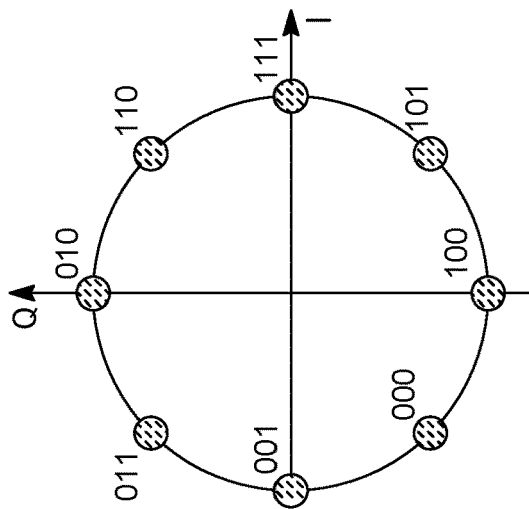
FIG. 5A, FIG. 5B, and FIG. 5C are example Constellation diagrams for BPSK, 4PSK, and 8-PSK modulations.
Figure 5B:
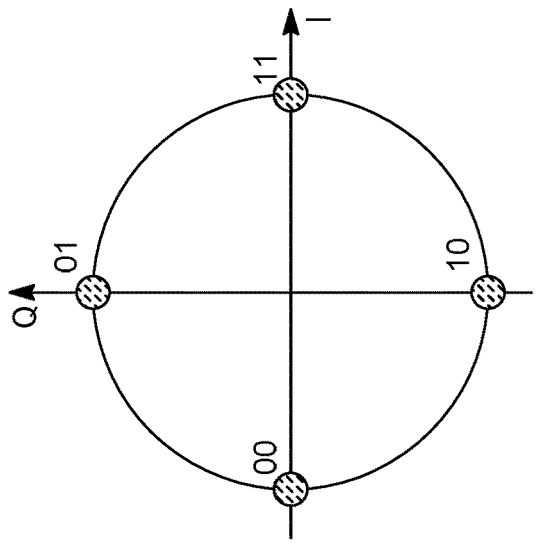
Figure 5A:
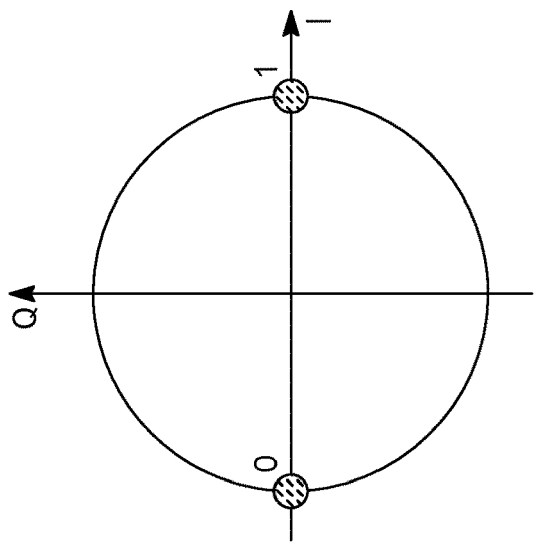

As an example, the 4PSK/QPSK modulated signals 202 are shown in FIG. 2, where $f_c T_s=3$ for example illustration. The symbols $S_0: S_3$ represent two bits that are Gray coded, as shown in the constellation in FIG. 5B. Similarly, BPSK and 8-PSK constellations also Gray-coded, as shown in FIG. 5A and FIG. 5C.

The (e.g., low-cost) constant-modular PSK modulation may be implemented by microcontrollers (MCUs) via General Purpose Input/Output (GPIO) ports, for example. Rectangular pulses of the carrier frequency may be generated at/by the GPIO by dividing system clocks to the desired frequency $f_c$. The carrier pulses may be delayed by a timer and/or a PWM module to generate the phase-shifted version of the carrier signal. The carrier-phase timer and/or the PWM may be controlled by the transmit symbol values. One or more other timers may control the symbol duration $T_s$. The carrier frequency of the acoustic communication may be in the range of 10 kHz to 1 MHz. The carrier phase resolution may be (e.g., may be required to be) at least, or better than, $1/(Mf_c)$ for the M-ary PSK modulation.

Figure 6:
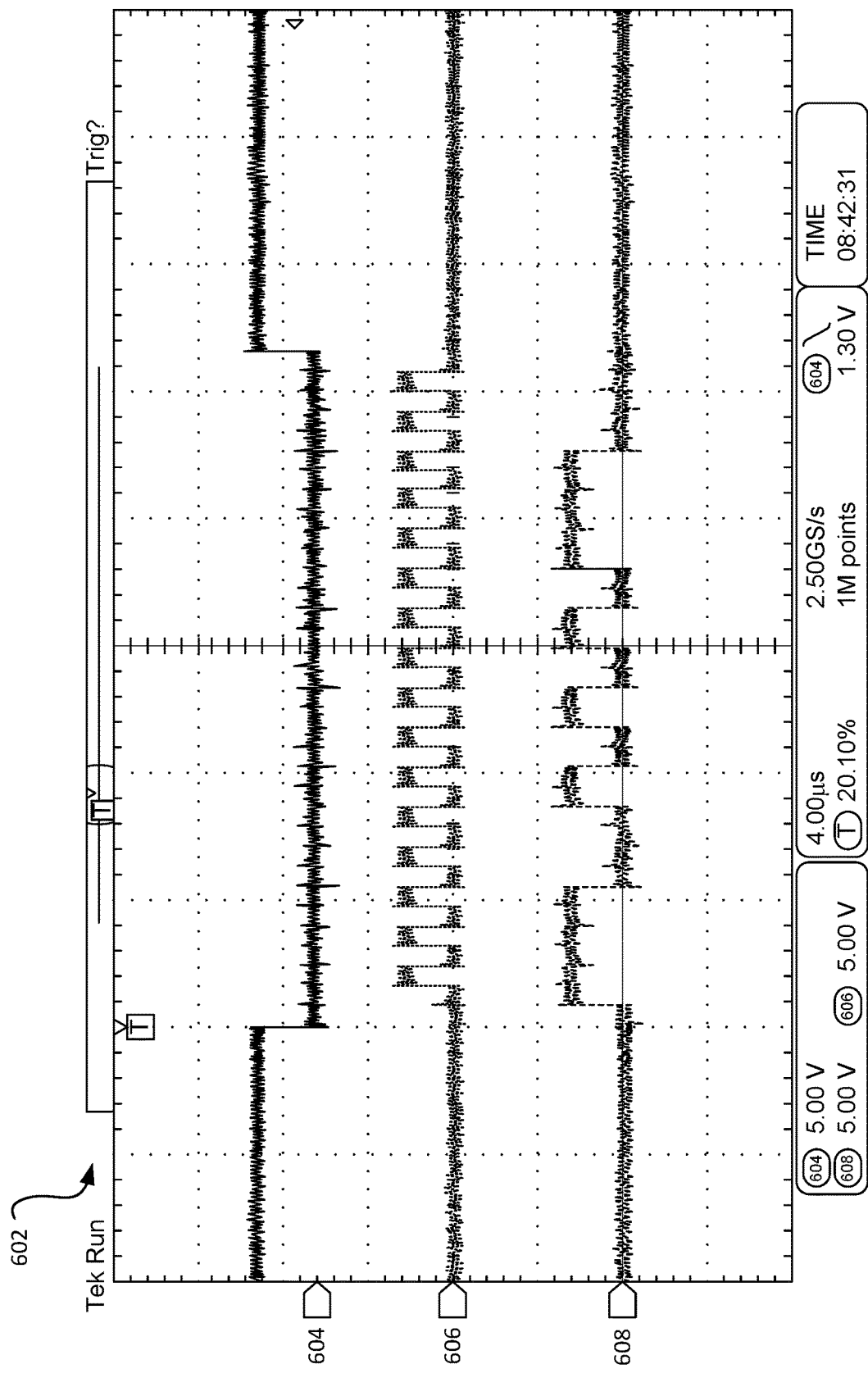
FIG. 6 illustrates an example of one or more serial peripheral interface (SPI) bus signals.

In one or more scenarios, the Nvidia Jetson and/or the Raspberry Pi might not achieve the required phase control on the GPIO ports via timer(s) and/or PWM. Technologies discloses herein may use a Serial Peripheral Interface (SPI) (e.g., a port configured on the 40-pin GPIO, among other SPIs). The SPI is a synchronous serial communication bus used for short-distance communication, for example in embedded systems. The SPI bus may include at least four signal wires: a serial clock (SCK), a Chip/Slave Select (SS), a Master In Slave Out (MISO), and/or a Master Out Slave In (MOSI). The SCK signal may be used for synchronous communication. The SS signal may be active low indicating data is transmitting from the master device. The data lines may be coded with Non-Return to Zero (NRZ) pulses, as shown in FIG. 6, where the selected slave device uses the rising edge of the SCK signal to read the data on the MOSI signal. In FIG. 6, the SPI bus signals 602, where the top 604 is the SS signal, the middle 606 is the SCK signal, and the bottom 608 is the MOSI signal which shows a 16-bit Hex code 0xE55C, for example.

The communication baud rate $R_{spi}$ of the SPI bus can be controlled via the SoC software, for example to the accuracy of the system clock. The SCK frequency may be set the same as the baud rate, for example, among other scenarios. As described herein, the SPI bus signals may be leveraged to generate the MIMO M-ary PSK signals.

Figure 7:
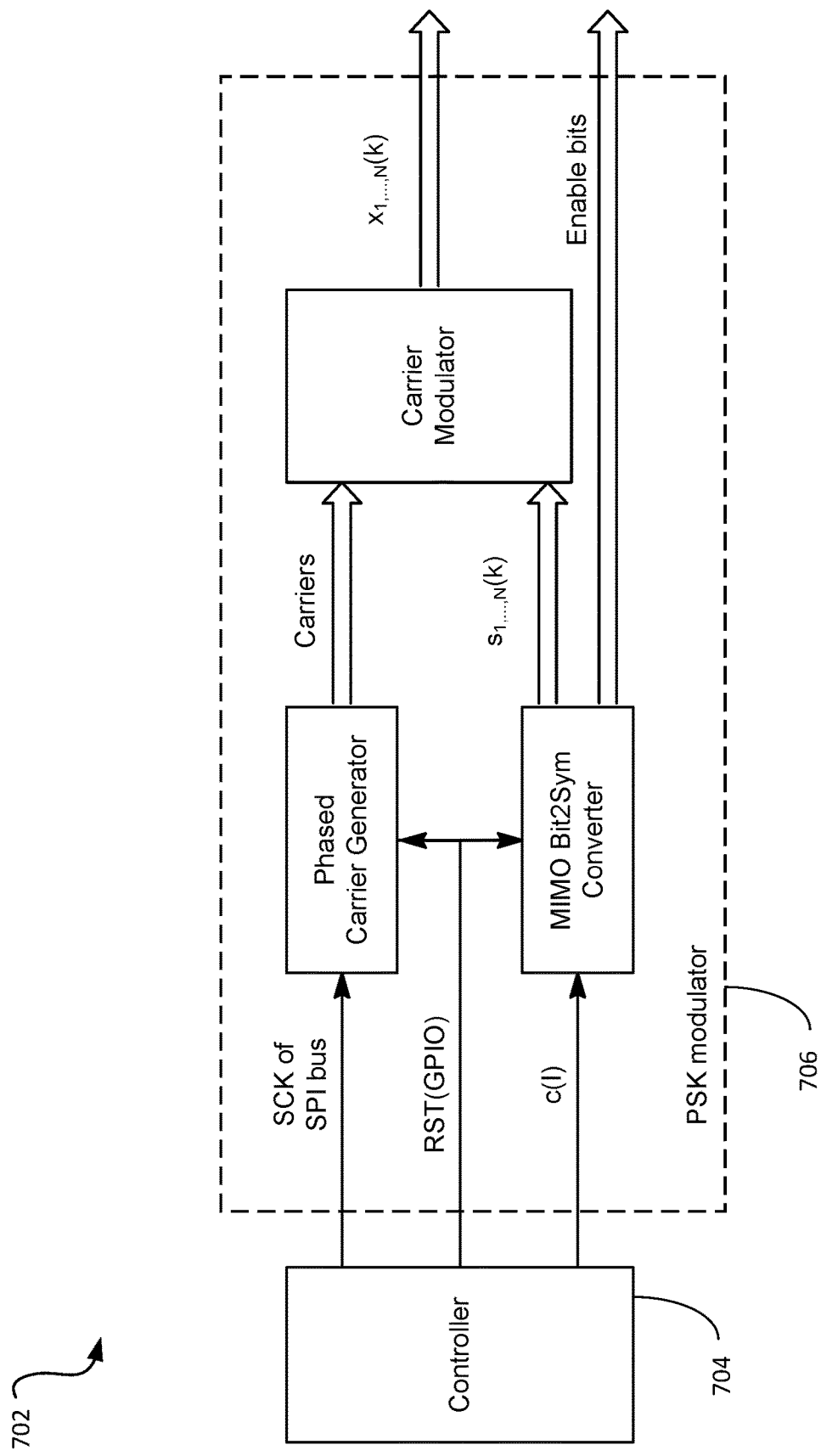
FIG. 7 illustrates an example block diagram of a PSK modulator device.

FIG. 7 is an example block diagram of a SPI M-ary PSK modulator assembly/device 702 (e.g., a video/sensing data PSK square wave generator). The PSK modulator assembly 702 may include a controller 704 (e.g., a GPIO, etc.) and a PSK modulator circuit 706. The PSK modulator 706 may include a phased carrier generator, a MIMO Bit2Sym converter, and/or a carrier modulator. The phased carrier generator may create M (e.g., a natural number, an integer, etc.) versions of the carrier frequency with m/M cycles of phase shifts. The MIMO Bit2Sym converter may multiplex the coded bits on the serial MOSI line into the desired N*(q+1) parallel bit streams. One or more, or each, of the N transmit branches may get q parallel bits, perhaps for example plus one Enable bit at one or more, or each, symbol duration. The carrier modulator may be a multiplexer where the desired phased carrier may be selected by the q bits as the output.

In one or more scenarios, the controller 704 (e.g., a 40-pin Jetson GPIO) the controller may provide at least four signals to the PSK modulator 706, such as at least three SPI signals and at least a GPIO signal RST. An SPI MOSI signal may carry the coded bits c(l) for one or more, or all, N transmit branches. An SPI SCK signal may provide the synchronous clock signal. An SPI SS signal (not shown) may be used to denote when a transmission may be completed. A GPIO signal RST may be used to clear the Bit2Sym converter and/or reset the binary counter in the PSK modulator circuit 706, perhaps for example after the transmission.

The phased carrier generator may convert the SPI SCK signal into the carrier frequency $f_c$ with $2\pi m/M$ phases, where m=0, . . . , M−1. As the carrier signal with phase $2\pi m/M$ is the inverted version of the carrier with phase $\pi+2\pi m/M$ for m=0, . . . , M/2, a total of M/2 carrier phases can be generated from a higher SCK frequency via a frequency divider, and/or the inverted phases can be generated by using inverters. In one or more scenarios, it may be useful for the SCK frequency to satisfy $R_{spi} \geq f_c M/2$.

The MIMO Bit2Sym converter may take the MOSI bit stream and may multiplex it into N transmit branches, of which one or more, or each, branch may include (e.g., require) q bits. An extra bit may be used to accompany one or more, or every, transmit branch so that the branch output can be turned on and off at any symbol duration. This may be useful when transmitting pilot blocks, inserting gaps, and/or selecting OOK modulation. The data rate of MOSI may satisfy the constraint $R_{spi} \geq N(q+1)/T_s$. Perhaps for the ease of implementation in the carrier modulator, among other scenarios, the product of the carrier frequency and the symbol duration $f_c T_s$ may be chosen to be an integer no less than 4, for example.

Figure 8A:
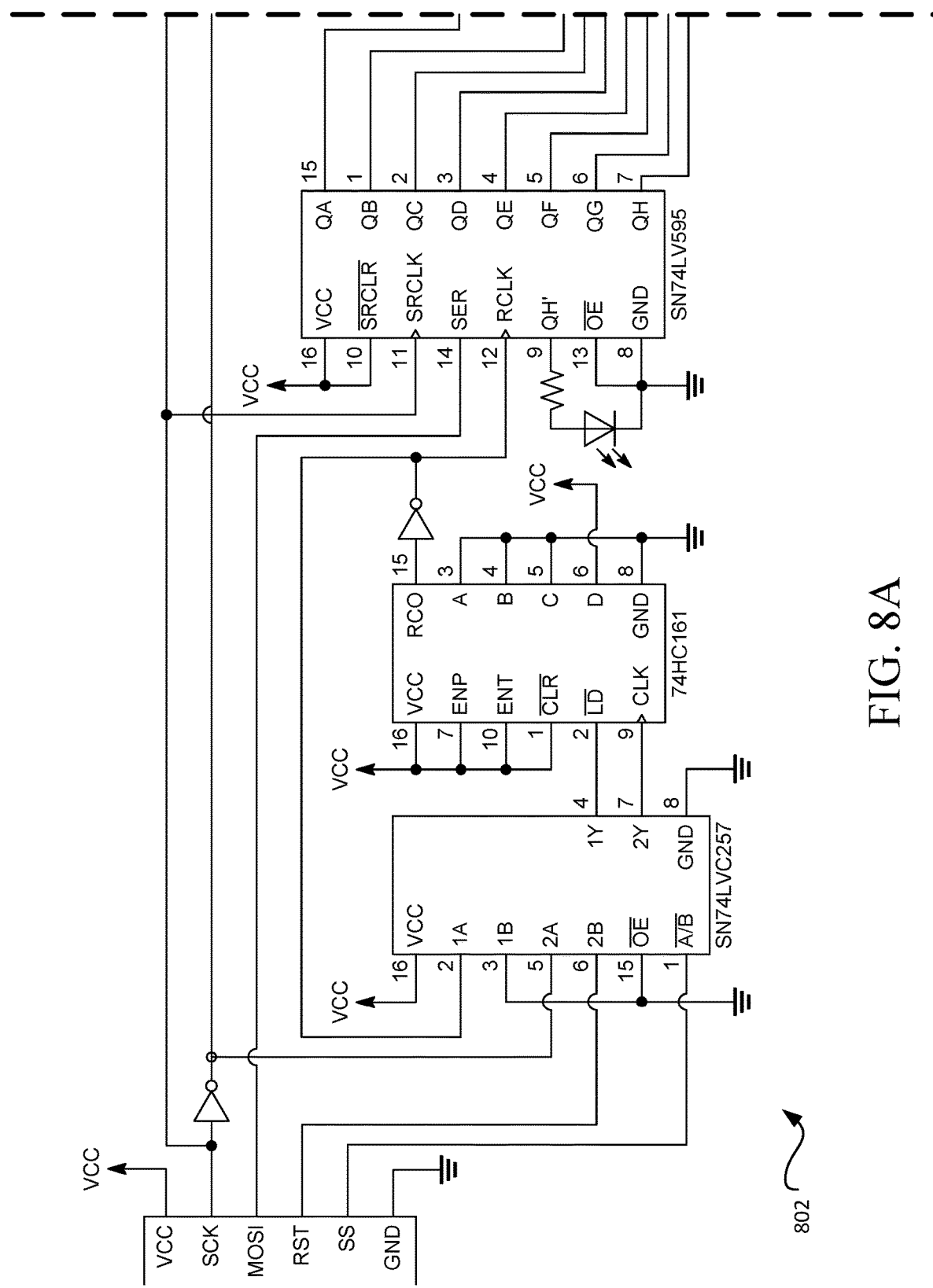
FIG. 8A and FIG. 8B illustrates an example of a four branch (4CH) BPSK modulation circuit/device.
Figure 8B:
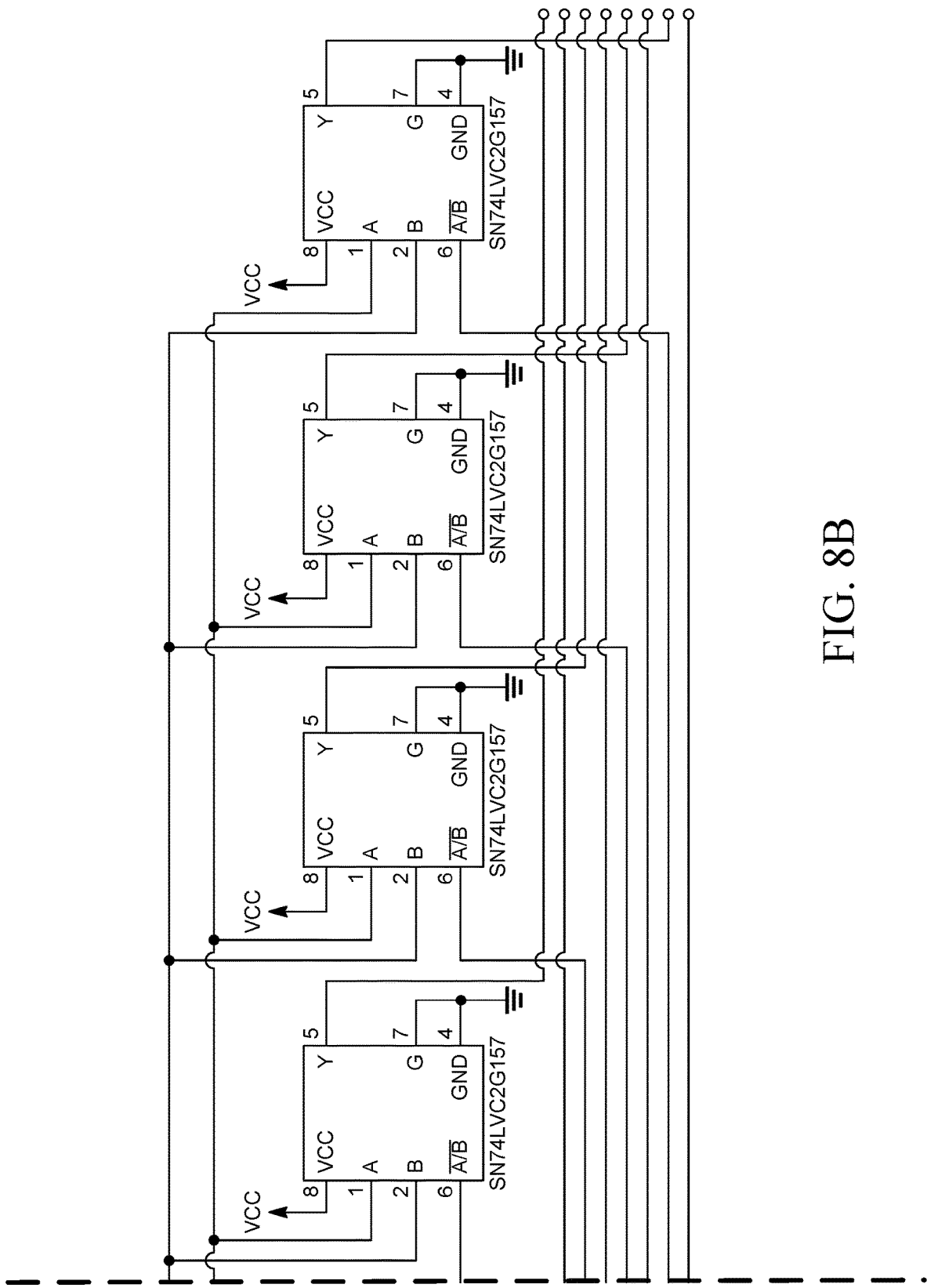

One or more designs of the MIMO modulator circuits can be implemented and/or tested for carrier frequency $f_c$=200 kHz and/or $f_c T_s$=8. At least one may be a BPSK/OOK (q=1) modulator for N=4 transmit branches circuit 802, as shown in FIG. 8A and FIG. 8B, where the SCK rate may be set to $R_{spi}$=200 kHz. The phased carrier generator may be implemented by an inverter. The 4 branch Bit2Sym converter may be implemented by a quadruple 2-to-1 data selector/multiplexer SN74LVC257, a binary counter 74HC161, and/or an 8-bit shift register SN74LV595, for example. The shift register may convert the serial MOSI data bits into 8 parallel bit streams with every two bits per transmit branch, for example.

The binary counter 74HC161 may divides the SCK rate $R_{spi}$ by 8 and/or may create the symbol rate $f_s=1/T_s$=25 kHz which may serve as the clock for the shift register. The SS of the SPI bus may be active low when the MOSI data is valid for transmission. The SS of the SPI bus may be used to select the A input ports as the outputs of the 2-to-1 multiplexer SN74LVC257. The SPI SCK signal may be connected to the CLK of the binary counter which may count $f_c T_s$ to create the symbol rate. The SS signal may become high, perhaps for example when the SPI bus may end the transmission. The B input ports of the 2-to-1 multiplexer may be selected. The binary counter may be reset by a rising edge on RST which may be controlled by a timer through a regular GPIO pin. The carrier modulator of one or more, or each, transmit branch may be implemented by a 2-to-1 multiplexer SN74LVC2G157. The information bit of one or more, or each, branch may be used to select the SCK and/or the inverted SCK as the modulated output. The enable bit(s) may be used to turn on or off the output buffer for the symbol duration, for example.

Figure 9A:
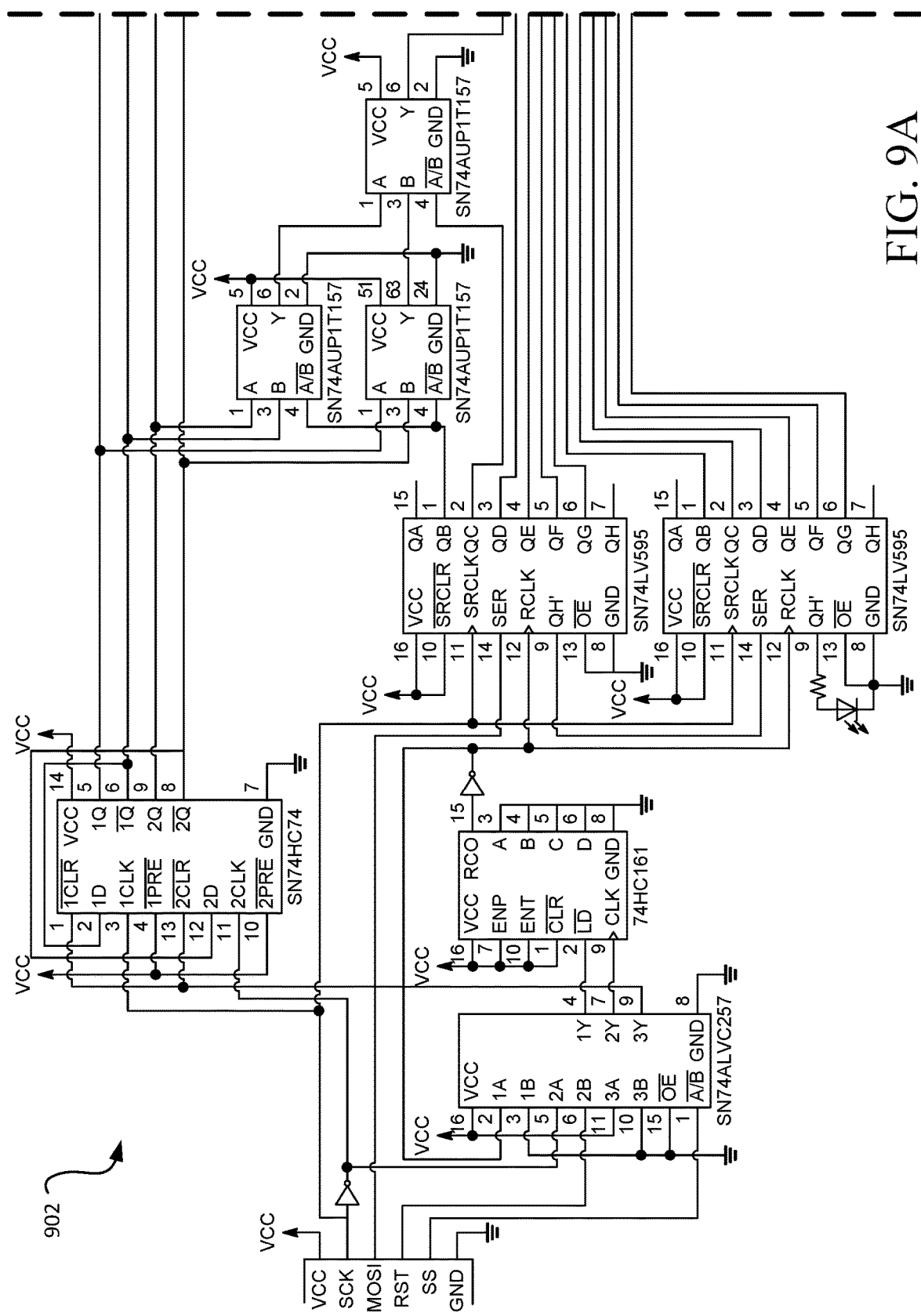
FIG. 9A and FIG. 9B, illustrates an example four transmit branch (4CH) 4PSK/QPSK modulation circuit/device.
Figure 9B:
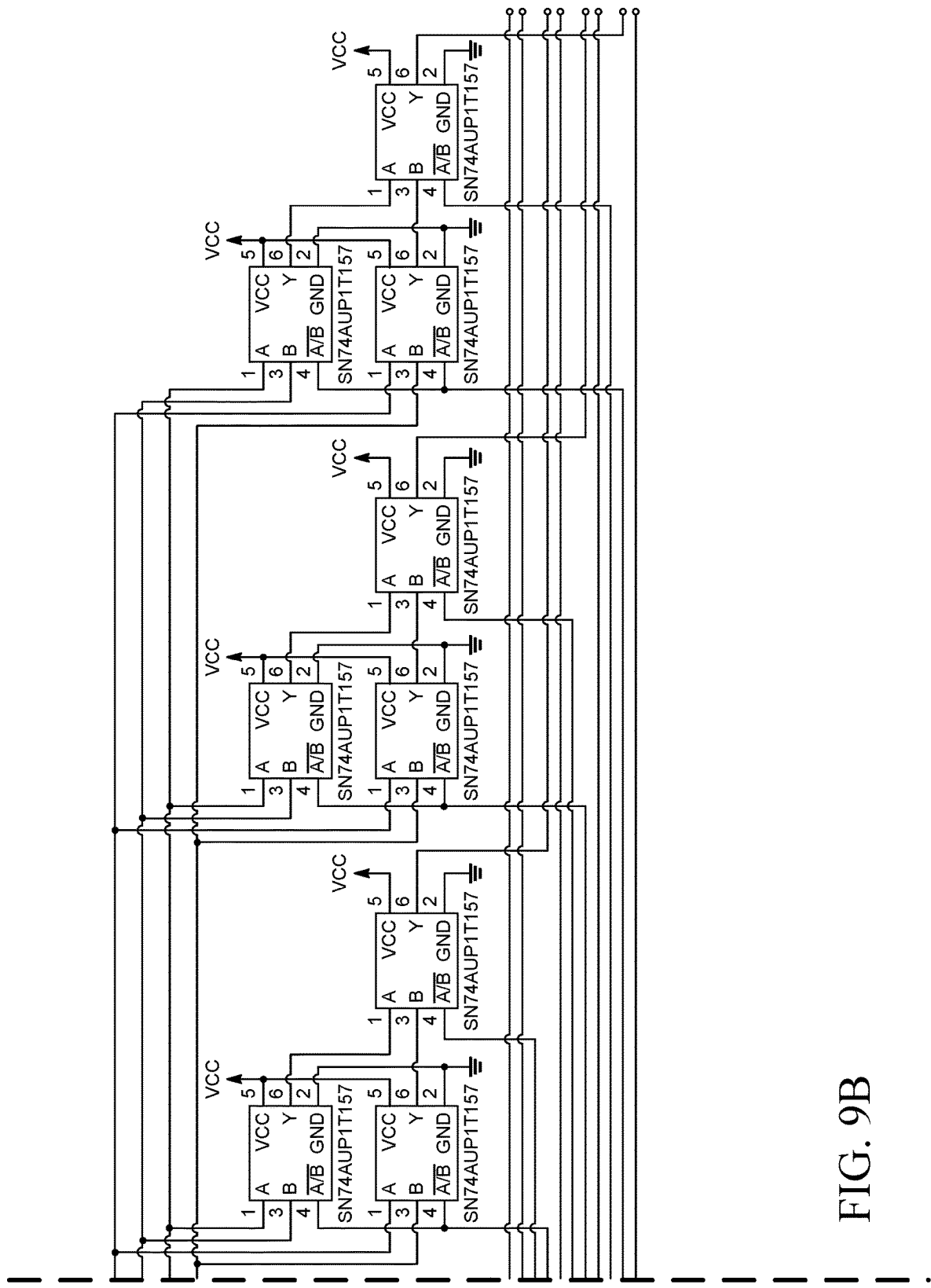

FIG. 9A and FIG. 9B illustrate an example QPSK modulator circuit/device 902. The circuit 902 may be a QPSK (q=2) modulator for N=4 transmit branches. The SCK rate may be set to $R_{spi}$=400 kHz, and the symbol rate may be set to $f_s$=25 kHz. The phased carrier generator may be implemented by a two-channel D-type flip flop SN74HC74 that may work as two frequency dividers, where it may divide the SCK rate $R_{spi}$ by 2 into at least four phased carriers with the carrier frequency $f_c$=200 kHz. The 4-branch Bit2Sym converter may be implemented by a quadruple 2-to-1 data selector/multiplexer SN74LVC257, a binary counter 74HC161, and/or two 8-bit shift registers SN74LV595. The shift registers may convert the serial MOSI data bits into 12 parallel bit streams with one or more, or every, three bits per transmit branch.

The binary counter 74HC161 divides the SCK rate $R_{spi}$ by 16 and may create the symbol rate $f_s=1/T_s$=25 kHz which may serve as the clock for the shift registers. Perhaps similar to the BPSK modulator, for example, the 2-to-1 multiplexer may be controlled by the SS signal of the SPI bus so that the binary counter 74HC161 and/or the D-type flip flop SN74HC74 can be reset by a rising edge on the RST signal after the transmission. The carrier modulator of one or more, or each, transmit branch may be a 4-to-1 data selector implemented by three 2-to-1 data selectors SN74AUP1T157. The information bits of one or more, or each, transmit branch may be used to select at least one of the phased carriers as the modulated output. The enable bit may be used to turn on and off the output buffer for the symbol duration, for example.

Figure 10A:
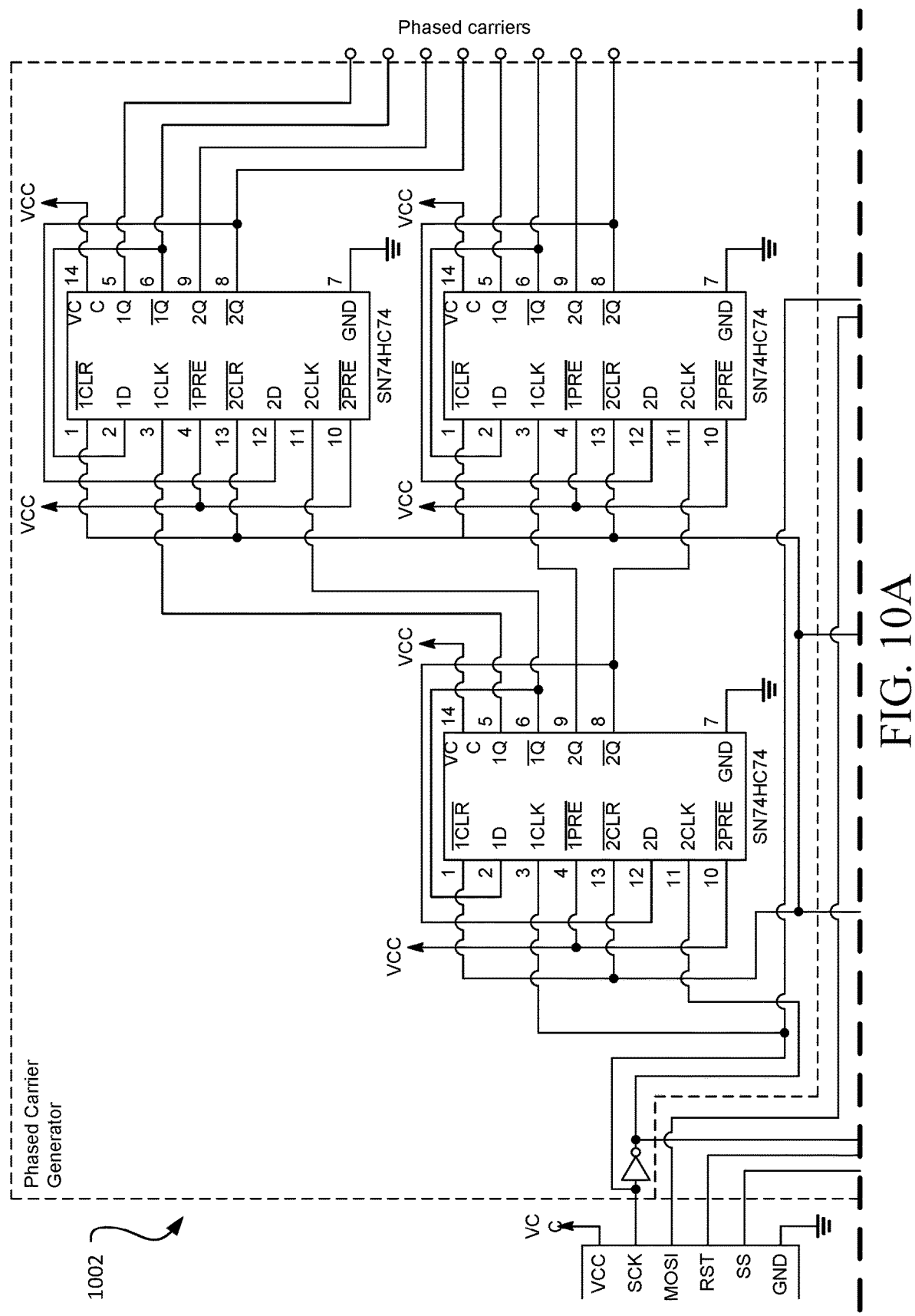
FIG. 10A, FIG. 10B, and FIG. 10C is an example of a phased carrier generator and MIMO Bit2Sym converter circuit/device for an 8-branch 8-PSK modulation.
Figure 10B:
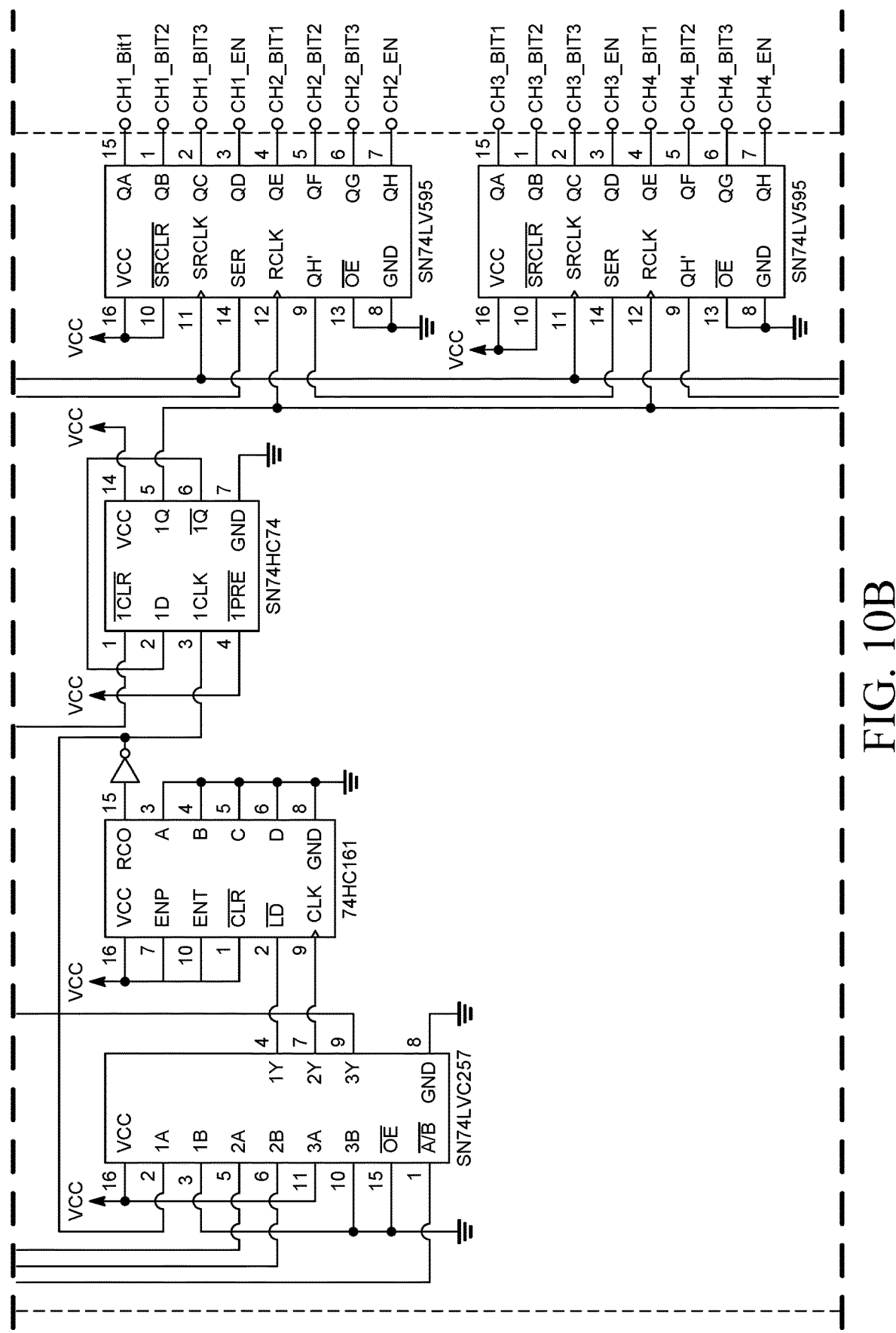
Figure 10C:
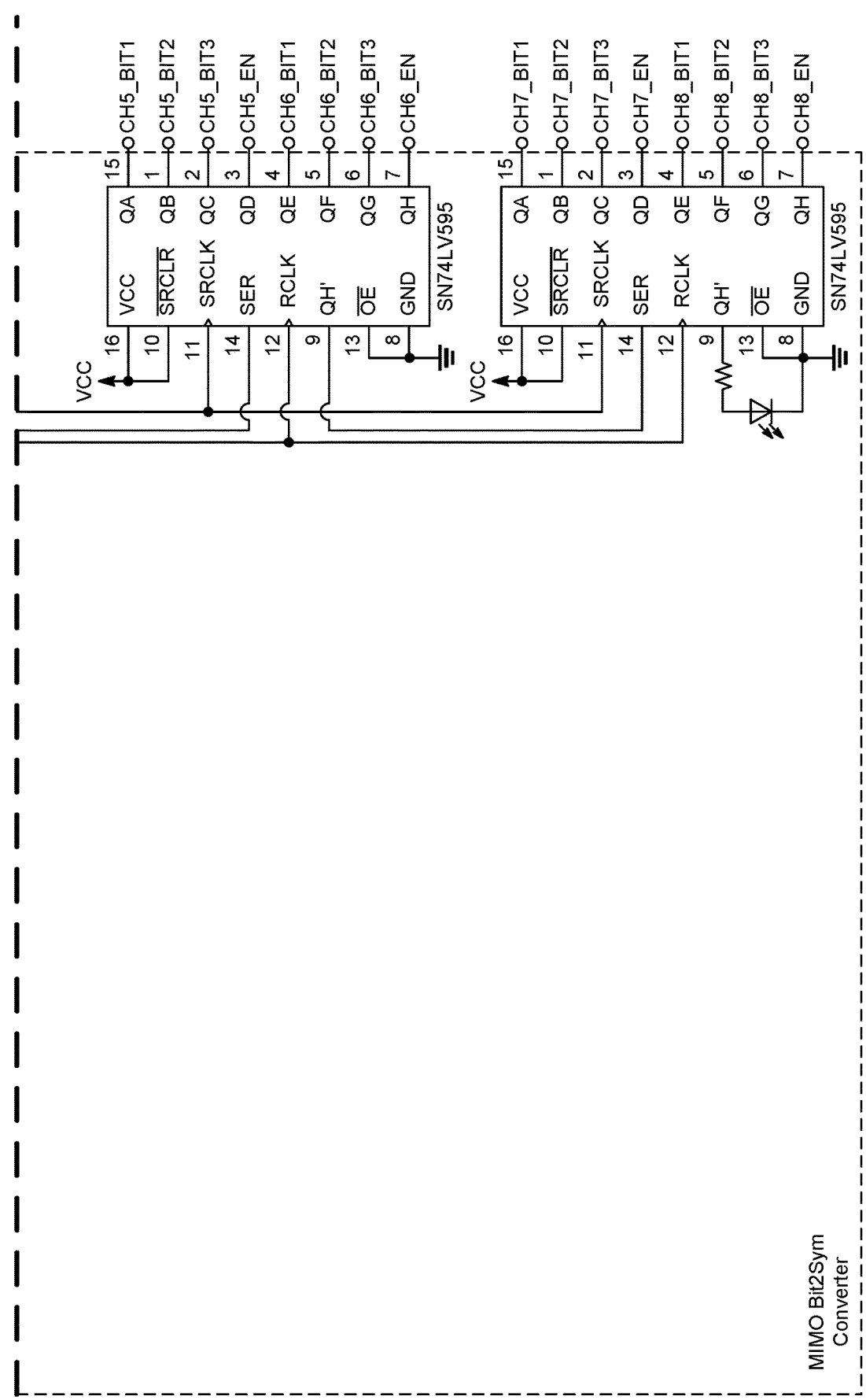
Figure 11A:
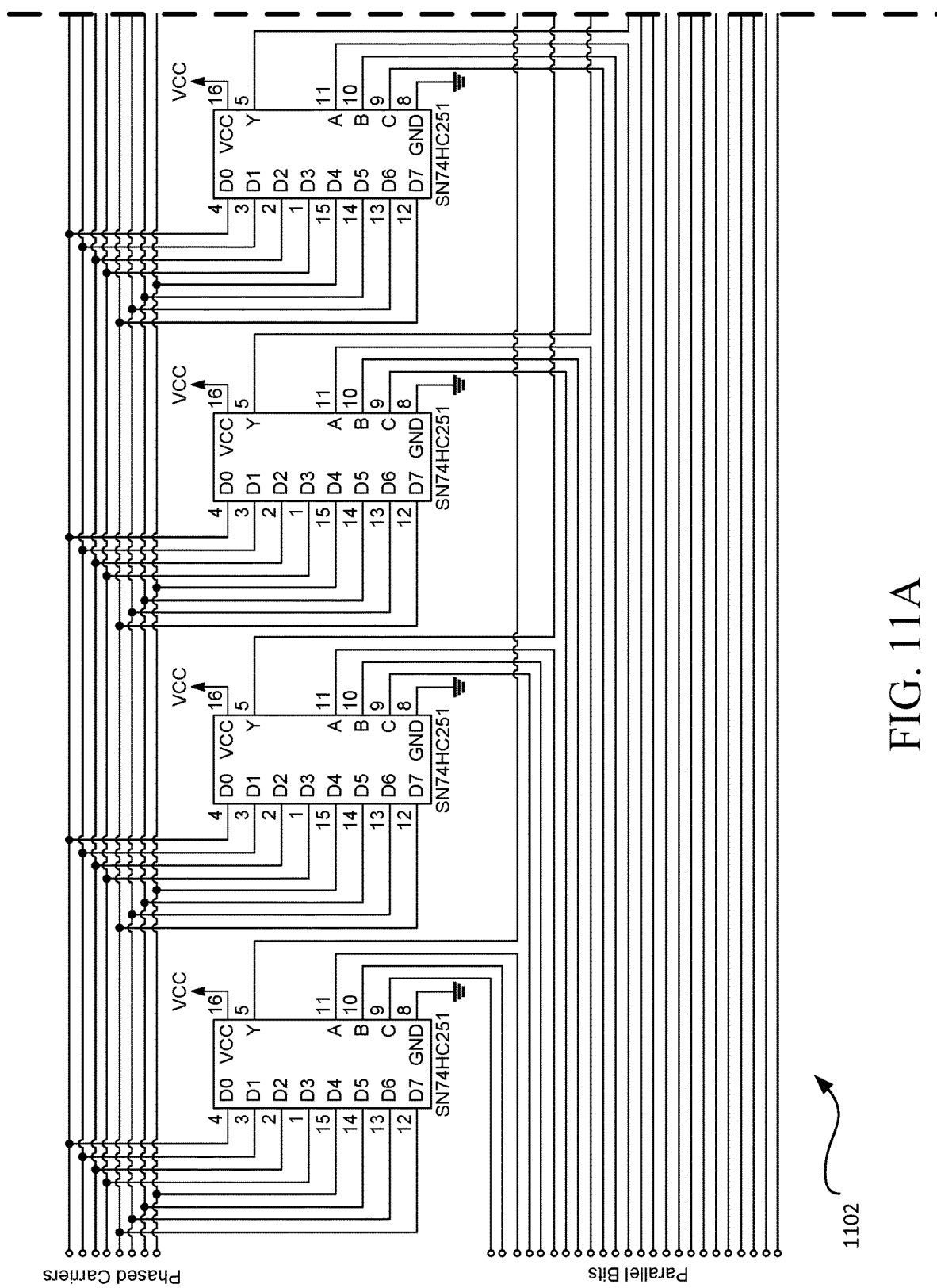
FIG. 11A and FIG. 11B is an example carrier modulator circuit/device of an 8-branch 8-PSK modulation circuit/device.
Figure 11B:
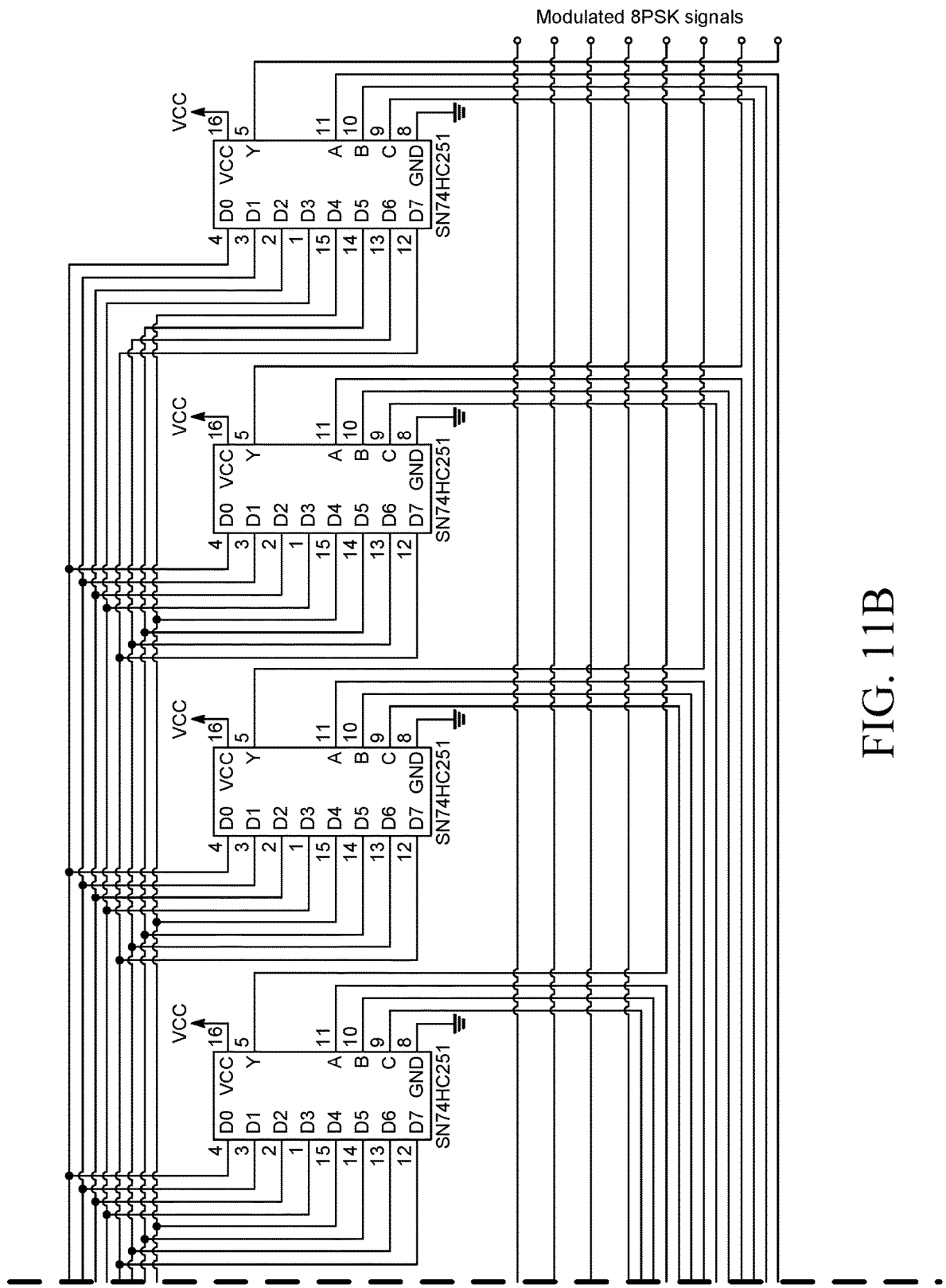

FIG. 10A, FIG. 10B, and FIG. 10C is an example of a phased carrier generator and MIMO Bit2Sym converter 1002 for an 8-branch 8-PSK modulation circuit/device 1102 of FIG. 11A and FIG. 11B. FIG. 11A and FIG. 11B illustrate the example carrier modulator circuit/device 1102. The circuits 1002 and 1102 may be an 8-PSK (q=3) modulator for N=8 branches where the SCK rate may be set to $R_{spi}$=800 kHz and/or the symbol rate may be set to $f_s$=25 kHz. The phased carrier generator may include six frequency dividers implemented by three two-channel D-type flip flops SN74HC74. The SCK of rate $R_{spi}$ may be divided twice and/or inverted into the eight phased carriers with the carrier frequency $f_c$=200 k Hz.

In one or more scenarios, the phased carrier generator can be implemented by at least eight counters (not shown). The 8-branch 8-PSK Bit2Sym converter may be implemented by a quadruple 2-to-1 data selector/multiplexer SN74LVC257, a D-type flip flop SN74HC74, a binary counter 74HC161, and/or a four 8-bit shift registers SN74LV595. The shift registers may convert the serial MOSI data bits into at least 32 parallel bit streams with one or more, or every, four bits per transmit branch. The binary counter 74HC161 and/or the D-type flip flop SN74HC74 may divide the SCK rate $R_{spi}$ by 32 and/or may create the symbol rate $f_s=1/T_s=25$ kHz, which may serve as the clock for the shift registers. Perhaps similar to the BPSK modulator and/or the QPSK modulator, the 2-to-1 multiplexer may be controlled by the SS signal of the SPI bus, for example, so that the binary counter 74HC161 and/or one or more, or all, D-type flip flop SN74HC74 can be reset after the transmission. The carrier modulator of one or more, or each, transmit branch may be implemented by an 8-to-1 data selector SN74HC251, where the three information bits of one or more, or each, branch may be used to select one of the phased carrier as the modulated output. The enable bit(s) may be used to turn on or off the output buffer for the symbol duration.

Figure 12B:
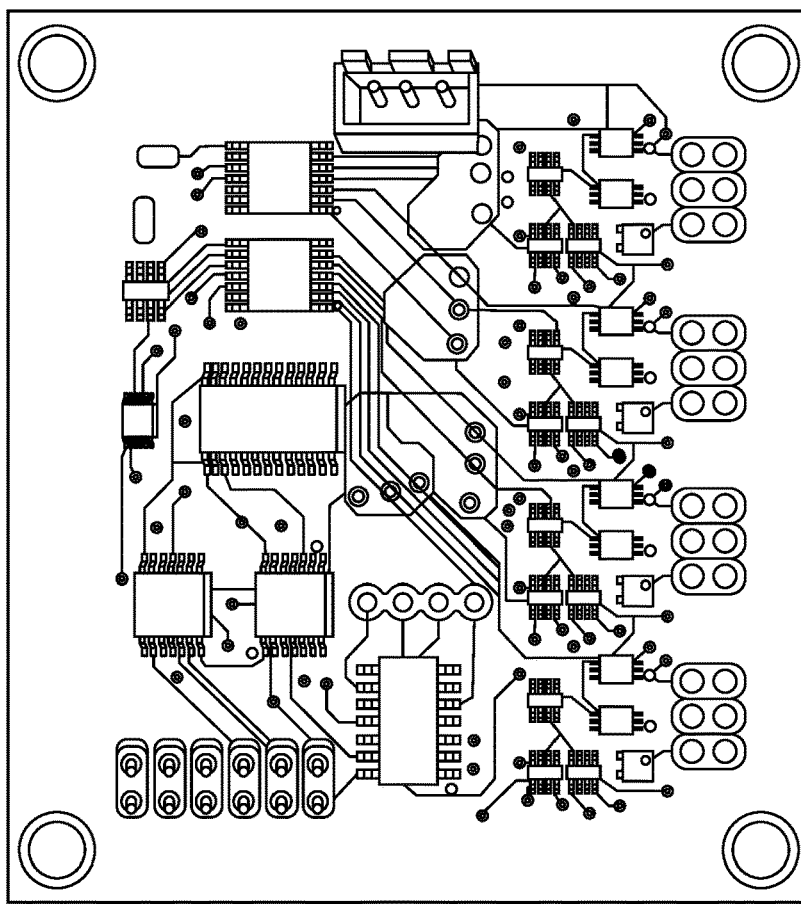
FIG. 12A and FIG. 12B are example illustrations of a 4-branch BPSK modulation circuit board and a 4-branch QPSK modulation circuit board.
Figure 12A:
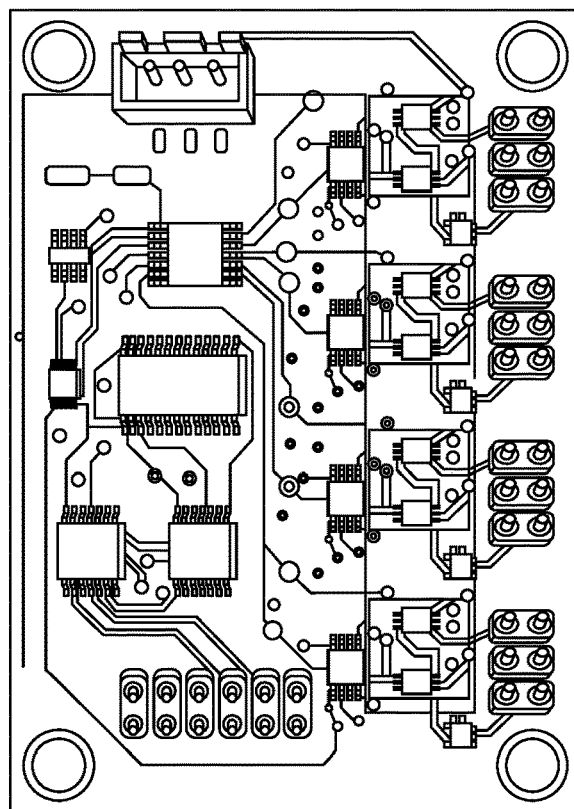
Figure 13:
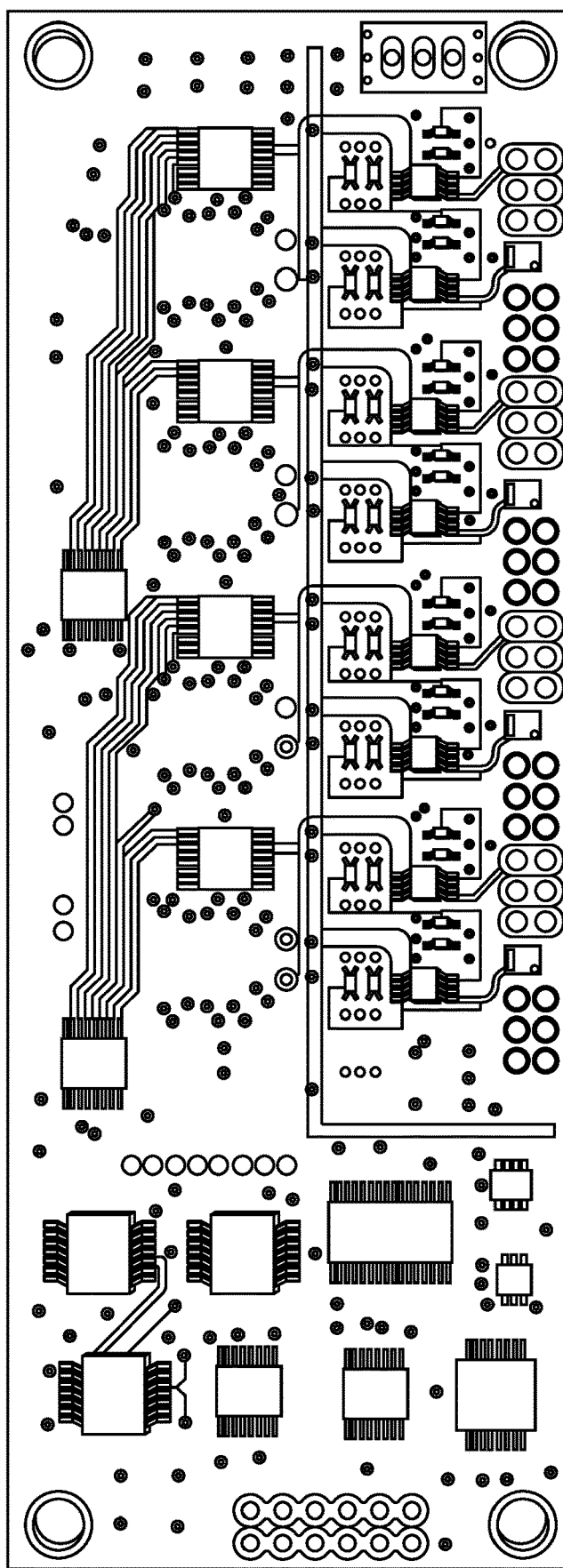
FIG. 13 is an example illustration of an 8-branch 8PSK modulation board modulation circuit board.

FIG. 12A and FIG. 12B are example illustrations of a 4-branch BPSK modulation circuit board and a 4-branch QPSK modulation circuit board. FIG. 13 is an example illustration of an 8-branch 8PSK modulation board modulation circuit board.

The Printed Circuit Board (PCB) example illustrations of assemblies of FIG. 12A, FIG. 12B, and FIG. 13 may correspond to the circuit diagrams of FIG. 8A, FIG. 8B, FIG. 9A, FIG. 9B, FIG. 10A, FIG. 10B, FIG. 10C, FIG. 11A, and FIG. 11B. The sizes of the two example circuit boards of FIG. 12A and FIG. 12B are 2.55 inches by 1.8 inches for the 4-branch BPSK circuit board and 2.55 inches by 2.3 inches for the 4-branch QPSK circuit board. The size of the example circuit board of FIG. 13 is 5 inches by 1.8 inches for 8-branch 8-PSK circuit board.

Figure 14:
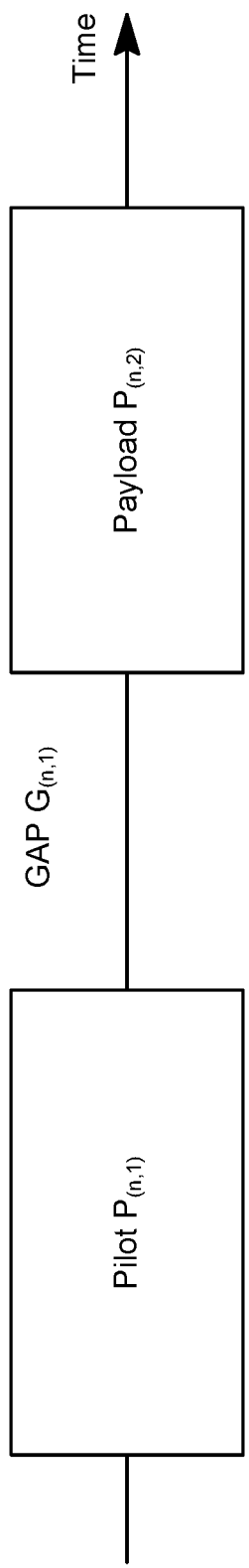
FIG. 14 is an example of a transmission packet structure for single carrier modulation.

In one or more scenarios, one or more, or every, packet of an example transmit branch may include a pilot block, a gap, and/or a payload block, as shown in FIG. 14, where $P_{(n,1)}$ denotes the pilot block and $P_{(n,2)}$ denotes the payload block of the nth transmit branch, respectively. The pilot block may be used for locating the signal and/or to estimate the channel, etc., and/or may be a BPSK sequence. The payload block may include the data, and/or may be a M-ary PSK signal with M≥2, for example. Perhaps for example, for (e.g., reasonably) accurate symbol synchronization, among other scenarios, the length of the gap $G_{(n,1)}$ between the two blocks may be (e.g., reasonably) controlled and/or may be set as an integer multiple of the symbol duration, among other scenarios.

Figure 15:
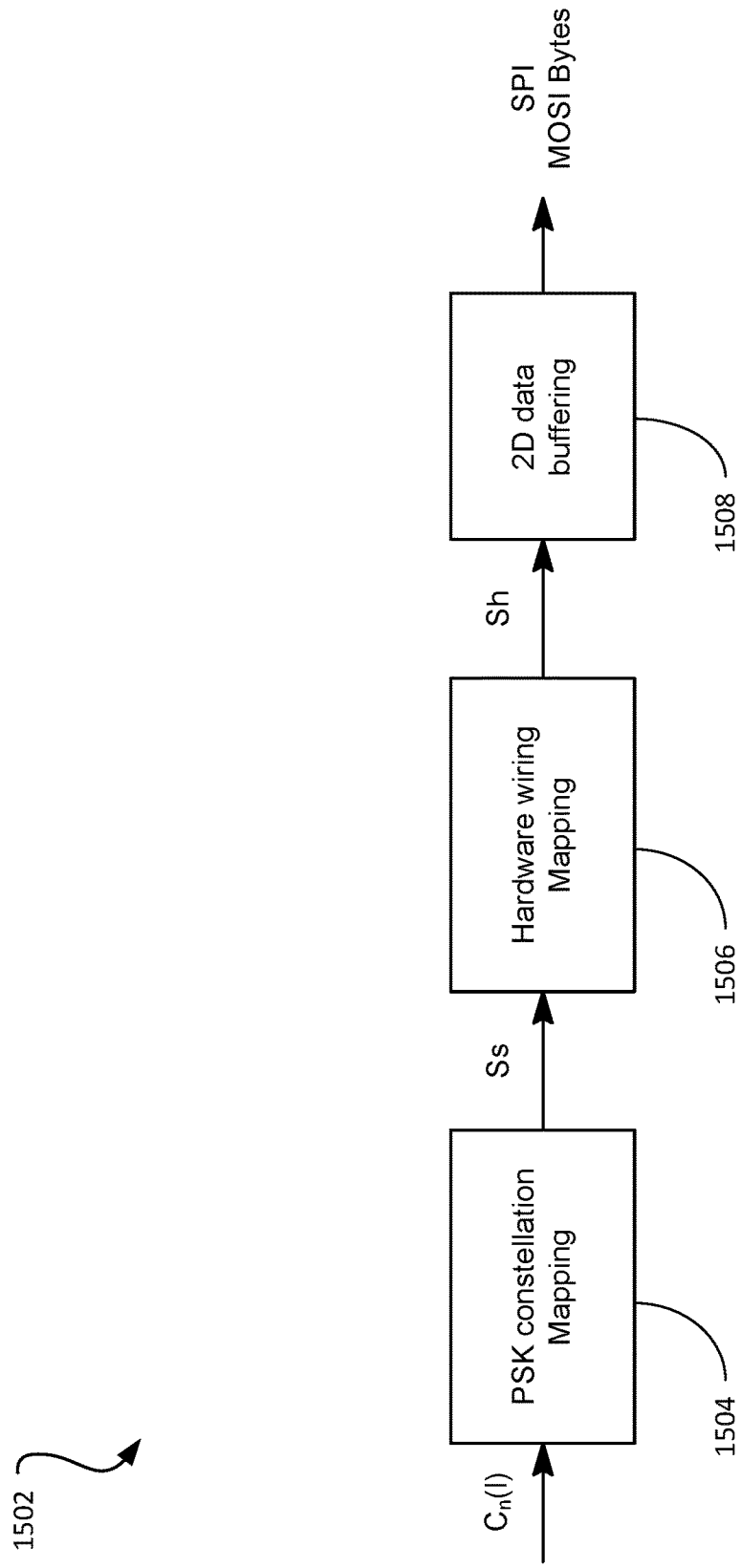
FIG. 15 is a block diagram of an example technique to map the data symbols to hardware suitable symbols.

In one or more scenarios, the software configuration may take the pilot and/or the payload bits and may convert them into one or more signals on the MOSI port of the SPI bus, for example. FIG. 15 illustrates a block diagram of an example technique/process to map the data symbols $S_s$ to the hardware suitable symbols $S_h$. The process may comprise at least a PSK constellation mapping 1504, a hardware control/wiring mapping 1506, and/or a 2D data buffering 1508. The PSK constellation mapping 1504 may group the bits ($c_n$(l)) into the symbols $S_s$ of the desired PSK transmission format, perhaps for example according to the constellation diagram of FIG. 5A, FIG. 5B, and/or FIG. 5C, where one or more, or each, symbol may contain $q_s$ bits.

The hardware control/wiring mapping 1506 may map a (e.g., desired) symbol $S_s$ into the hardware control symbol $S_h$ which may contain at least q bits per symbol, for example. In one or more scenarios, the hardware circuit may be used for a different PSK format. The hardware symbols $S_h$ may be different from the desired transmission symbols $S_s$, perhaps for example based on the different PSK format. For example, if the hardware circuit is an 8-PSK modulator, then one or more, or each, $S_h$ symbol may contain q=3 bits. For example, if a BPSK pilot block is to be transmitted on the circuit, the desired PSK symbol $S_s$ may contain $q_s=1$ bit per symbol.

Figure 16:
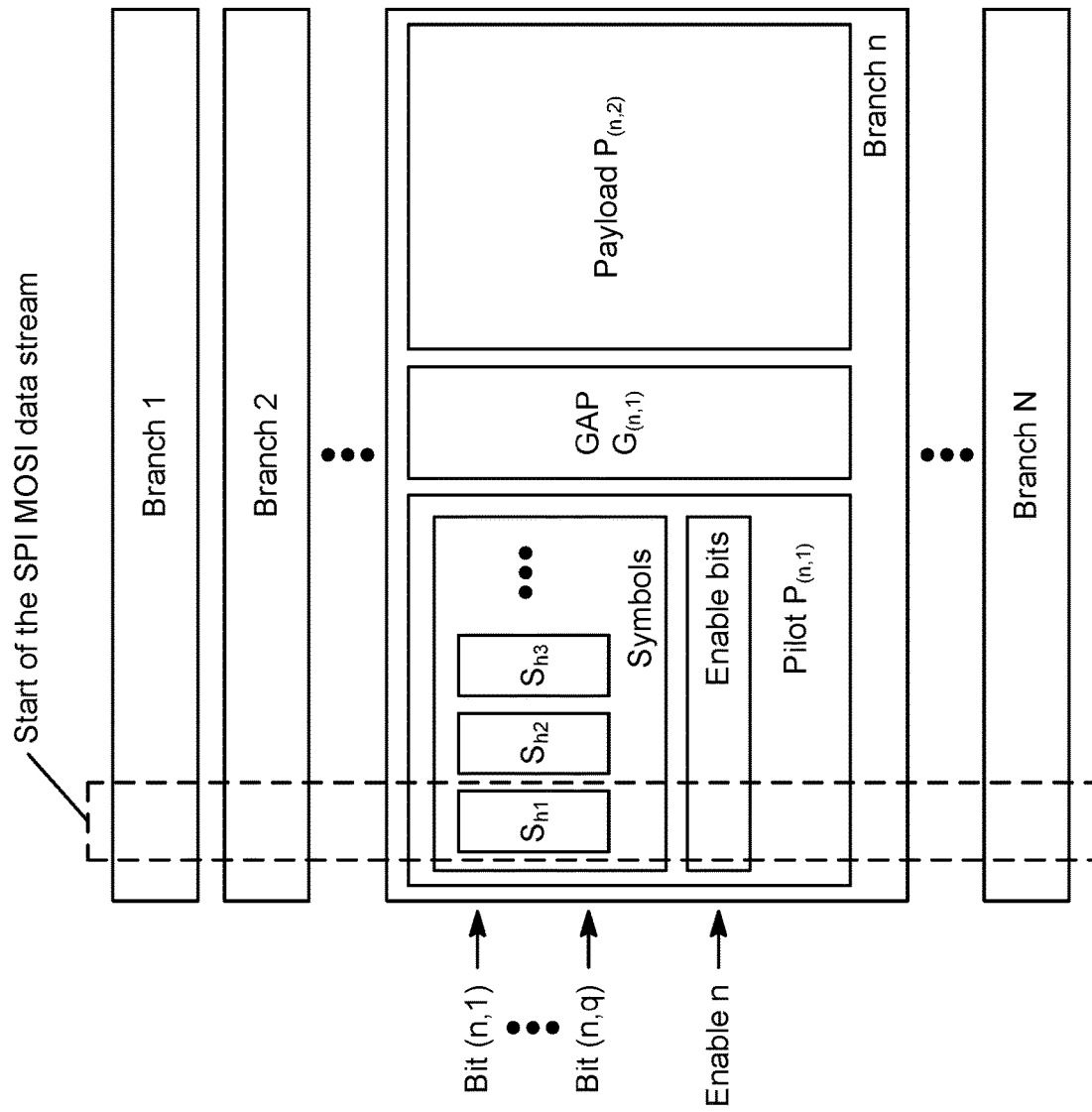
FIG. 16 is an example block diagram of a bits organizing buffer to generate a bit stream for a SPI MOSI port.

The hardware mapped symbols $S_h$, perhaps for example along with the enable bits and gap length, may be filled into the 2D data buffer 1508 of N(q+1) rows, as shown in FIG. 16, where one or more, or each, (q+1) rows may correspond to at least one transmit branch. The number of columns may be equal to the number of symbol duration $T_s$ in each packet, for example, the length of ($P_{(n1)}$, $G_{(n)}$, $P_{(n2)}$), denoted as $N_f$. The buffer structure of the nth branch is illustrated in FIG. 16. The symbol block may be composed of q bits per symbol plus an enable bit. Perhaps for example to generate the gap, among other reasons, some, or all, contents of the corresponding buffer elements may be set to 0. The total size of the 2D buffer may be N(q+1)×$N_f$. Perhaps once the data is stored in the 2D buffer 1508, the SPI bus may read the buffer in columns and/or may send them in bytes by the SPI MOSI port, for example, among other scenarios.

In one or more scenarios, the circuit designed for a larger N value can also be programmed to accommodate a smaller number of transmit branches, for example. If the number of transmit branches is smaller than the N designed in the circuit, the enable bits for the unused branches may be set to zero.

One or more scenarios contemplate sensing data (e.g., video, other sensing data, etc.) transmission through underwater acoustic communication devices/channels. Underwater wireless communication presents numerous challenges, for example due to the limited bandwidth and/or the unpredictable nature of the ocean environment. Currently, underwater acoustic communication may be limited at ~10 kbps for medium-distance wireless communications, which is relatively far from the (e.g., reasonably) required video/sensing data transmission rate of 0.5 Mbps, for example. Technologies described herein may utilize the 200 kHz transducers to implement multiple-input multiple-output (MIMO) on a processor/controller, such as for example the Nvidia Jetson or Raspberry Pi platform. For example, an 8-by-8 MIMO and/or 4-by-4 MIMO systems/devices/circuits as described herein can achieve underwater video/sensing data transmission over 200 m distance for example.

Figure 22:
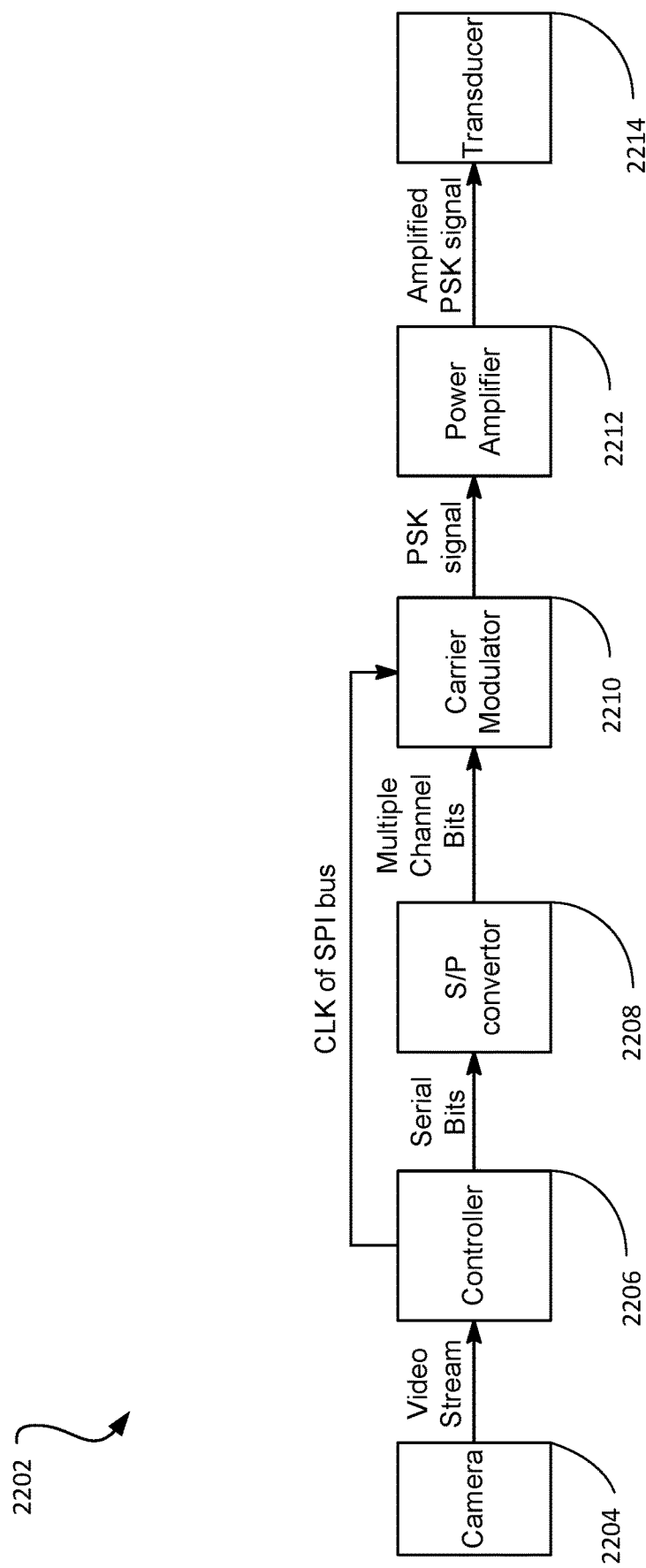
FIG. 22 is a block diagram of an example video transmission system/device.

One or more contemplated underwater acoustic video/sensing data transmission devices, such as device 2202 may include (e.g., a CSI and/or USB) camera 2204, a (e.g., Raspberry Pi and/or Jetson Xavier NX) controller 2206, a serial to parallel (S/P) converter 2208, carrier modulator(s) 2210, 8-channel Power Amplifiers (PA) 2212, and/or transducer(s) 2214 and matching circuits (not shown), as shown in the FIG. 22. The controller 2206 may process the (e.g., compressed) camera 2204 data with a convolutional encoder and/or an interleaver, and/or may feed the processed data to the serial to parallel converter 2208 via its SPI (Serial Peripheral Interface) bus.

The carrier modulator 2210 may modulate the multiple channel bits with the carrier frequency that may be provided by the SPI bus clock, for example. The power amplifier(s) 2212 may convert the multi-channel signals into high voltage and/or may drive the transducer(s) 2214. Carrier synchronization among one or more, or all, channels may be controlled. A PCB board may be designed to contain the S/P converter 2208, carrier modulator 2210, and PA 2212 for at least 8 channels. The controller 2204 may be programmed by Python, for example, among other languages.

Figure 23:
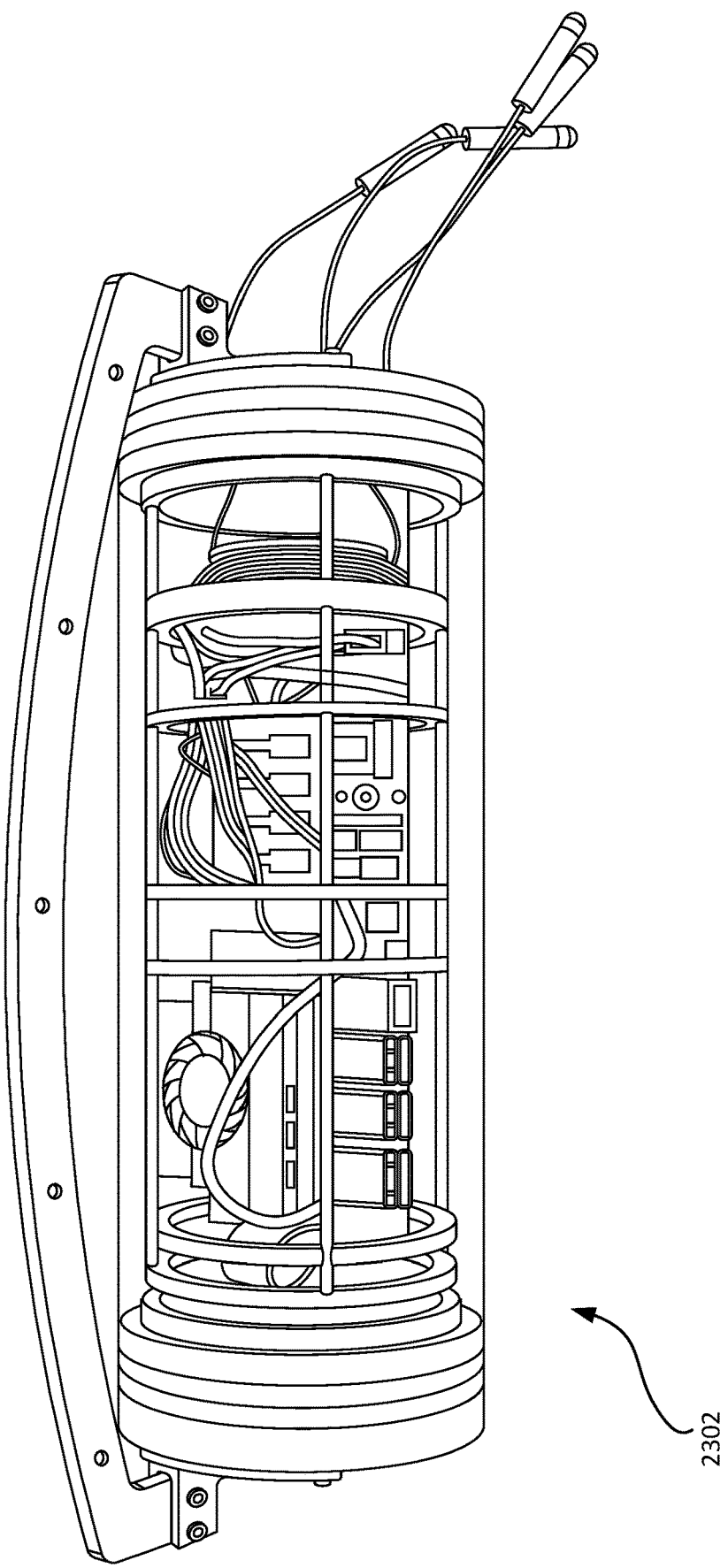
FIG. 23 illustrates an example prototype of an acoustic transmission device capable of underwater and/or wireless MIMO video content communications.

FIG. 23 illustrates an example transmitter device 2302 of an acoustic transmission device capable of underwater and/or wireless video content/sensing data communications. The transmitter device 2302 may be housed in an acrylic tube. The transmitter device 2302 may be configured to use a carrier frequency of 200 kHz, a symbol rate of 25 kHz, and/or a BPSK and/or QPSK modulation, for example. A constraint length of 9 and/or a rate of 1/2 convolutional code may be used for the video/sensing data payload. One or more preambles of m-sequences may be used for carrier and/or symbol synchronization. A video stream/sensing data stream may be 64×48 pixels and/or the frame rate of 2 fps for the transmitter device 2302.

In one or more scenarios, a receiver (not shown) used for testing the transmitter device 2303 was a data acquisition system including multi-channel low noise amplifier (LNA), bandpass filters, level shifters, ADCs, and/or FPGA processors. In one or more scenarios, the passband signals were sampled at 2 Msps and the received data were post-processed via Matlab.

Figure 24:
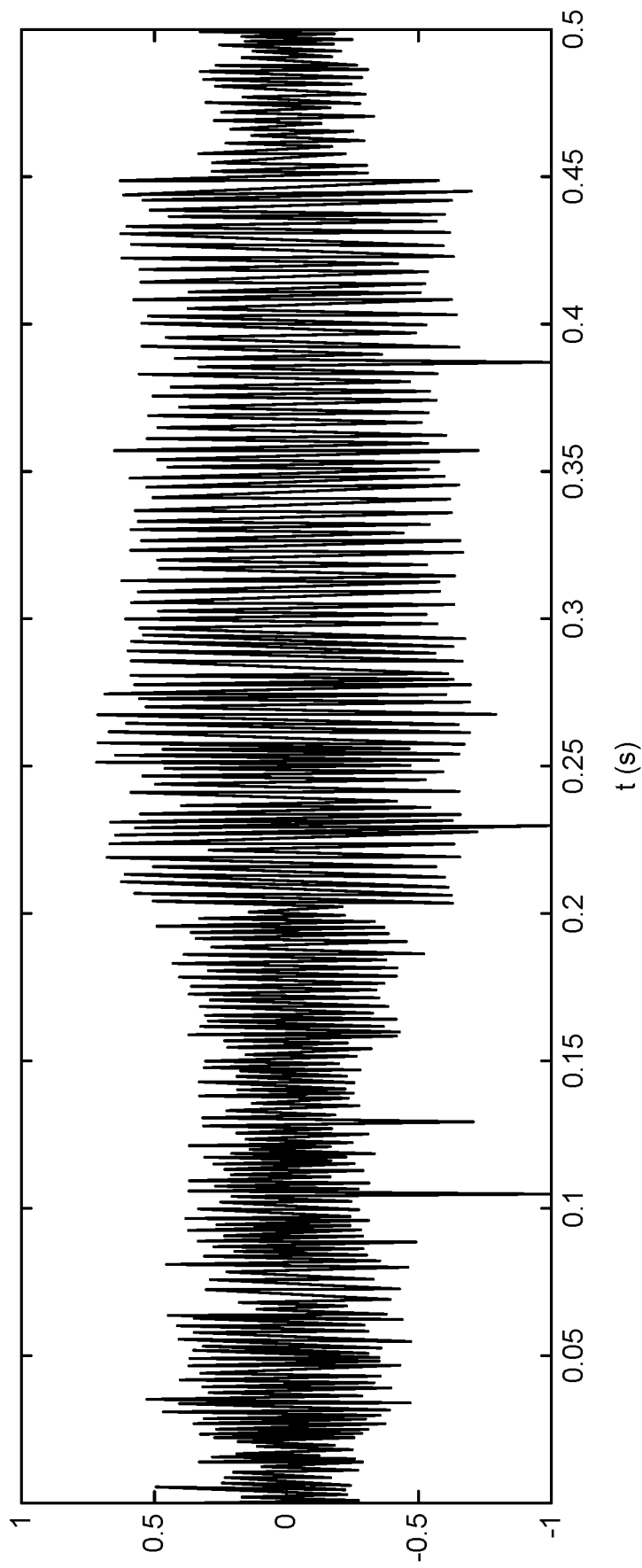
FIG. 24 is an illustration of at least one received signal from a transmitter device utilizing one or more techniques described herein.

One or more field tests on the video/sensing data transmission device 2302 were made in a freshwater lake. The Tx-Rx distance was 65 m, and the received signal-to-noise ratio (SNR) was ~15 dB. As shown in the FIG. 24, at least one of four transmission channels transmit m-sequences individually, then simultaneously transmitting the video signal/sensing data stream. The amount of transmitted bits was 6144 bits per frame after the convolutional encoding, assuming the video/sensing data stream had 64×48 pixels. In other scenarios, video content was recovered/transmitted with a resolution of 640×480 pixels, for example.

In one or more scenarios, a 2-by-2 MIMO transmission, with the fixed data, was used to test the transmission and decoding algorithm(s). For the 2-by-2 MIMO test, two reference pictures (A & B) with the resolution of 32×32 pixels were transmitted and decoded. After channel equalization, there are 4096 bits, of which 365 are error bits. The bit error rate (BER) was 8.9%. After the bits were decoded by the convolutional decoder, there are 1024 bits, of which 191 are error bits, resulting in a BER of 10.3%.

Figure 17A:
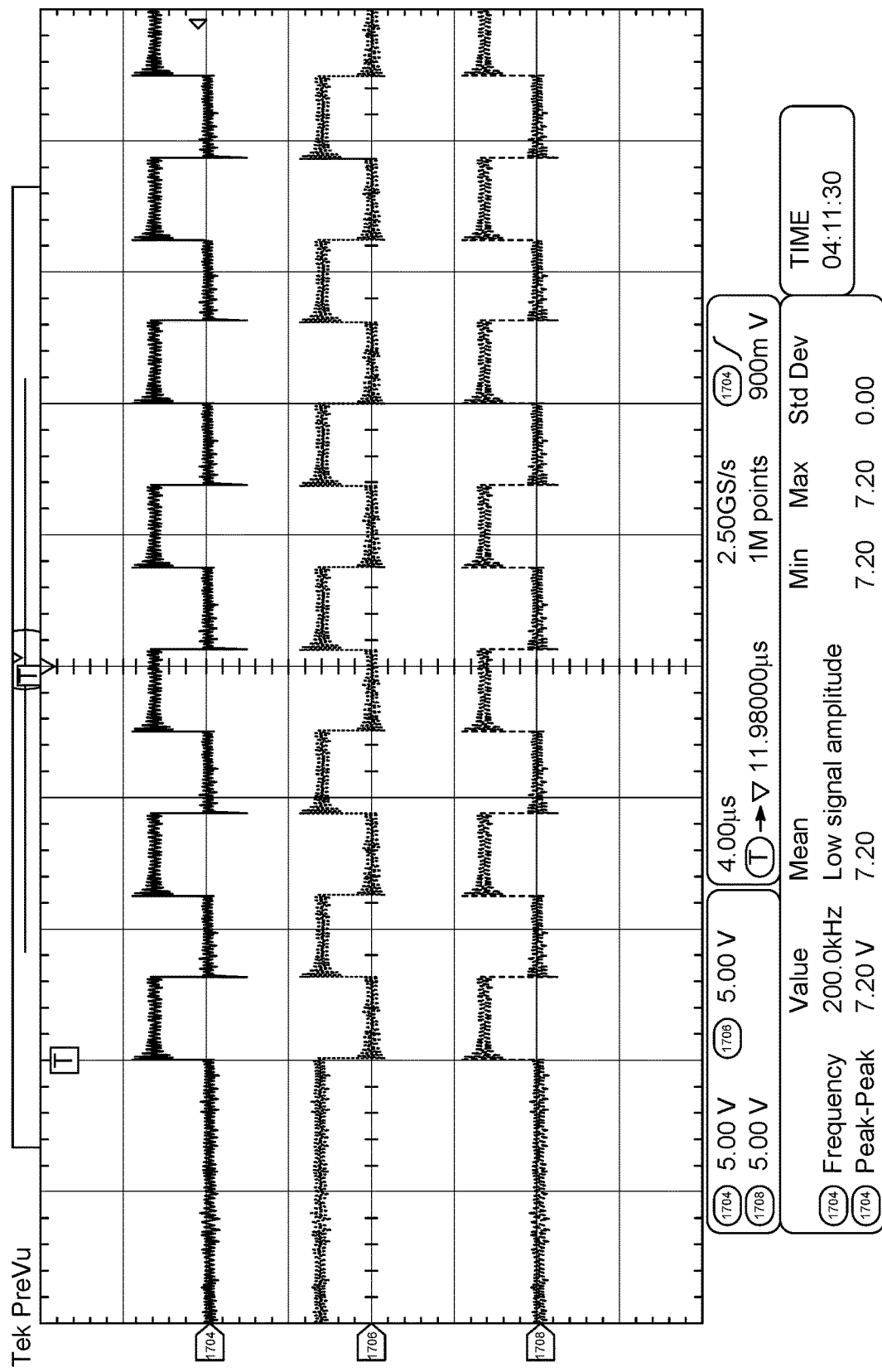
FIG. 17A, FIG. 17B, and FIG. 17C illustrates an example of testing measurements of one or more phased carriers of a BPSK, a QPSK and an 8-PSK modulator boards.
Figure 17B:
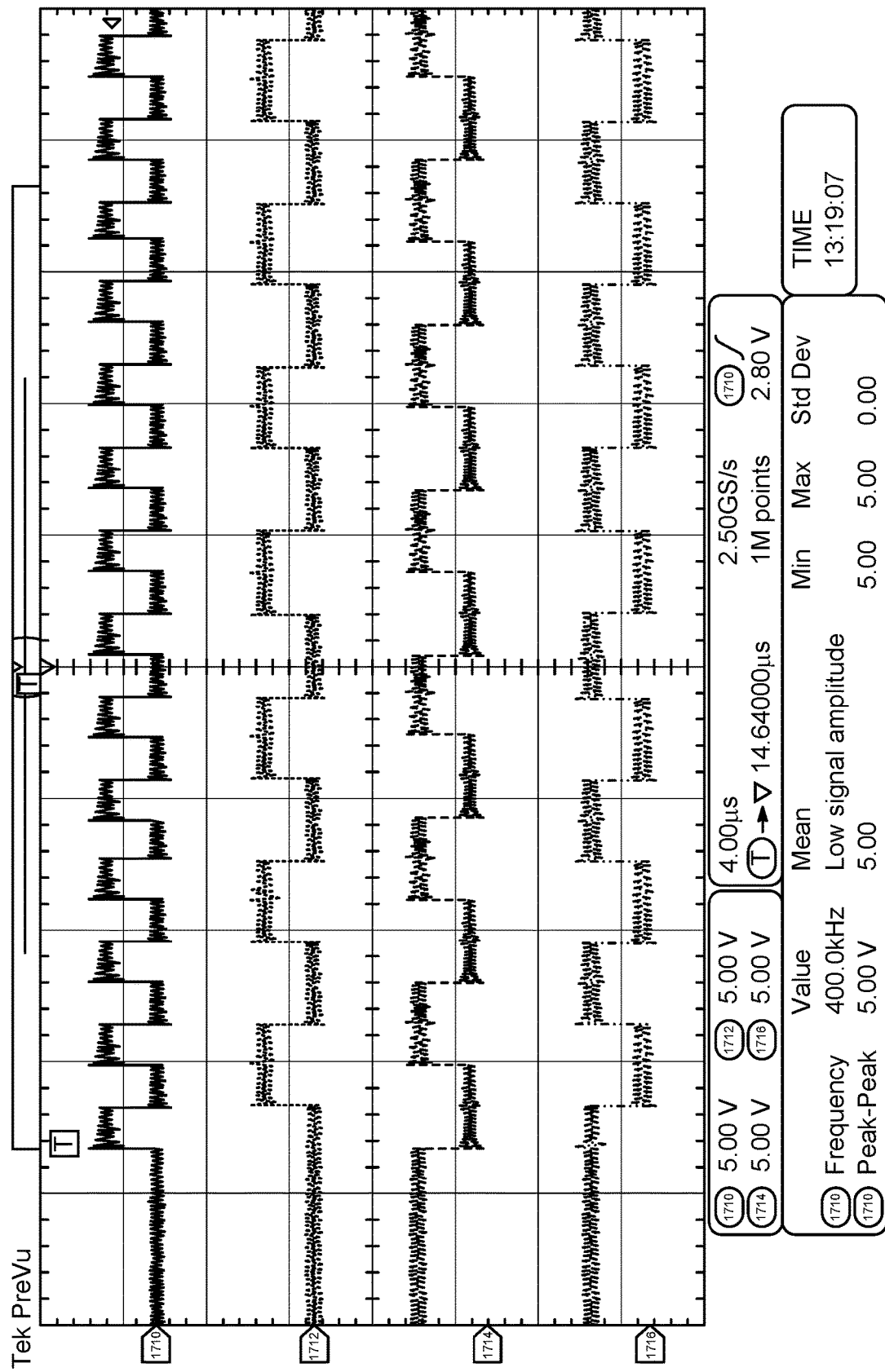
Figure 17C:
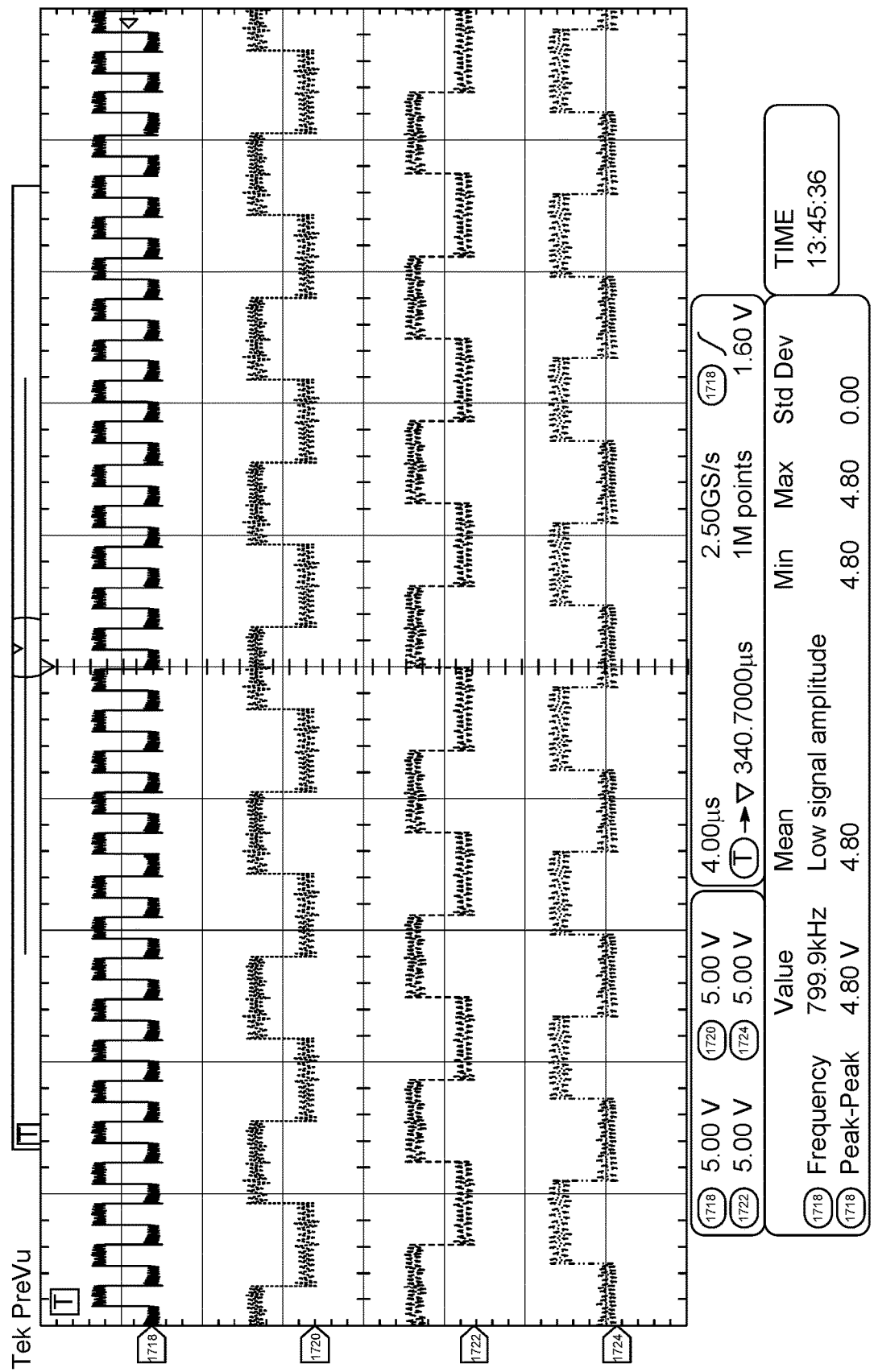

The various MIMO transmitter circuits described herein have been tested for BPSK, QPSK, and 8-PSK modulation schemes and/or for up to eight (8) transmit branches. An oscilloscope with four (4) probing channels was used to capture the phased carrier modulator outputs and SCK of the SPI bus, as shown in FIG. 17A, FIG. 17B, and FIG. 17C. One or more phased carriers of a BPSK, a QPSK, and an 8-PSK modulator boards with $f_c$=200 kHz and $f_s$=25 kbps are illustrated, for example. In FIG. 17A, at least two BPSK carriers 1706 and 1708 are measured while a SCK signal 1704 is measured at $R_{spi}$=200 kHz, for example. In FIG. 17B, at least three QPSK carriers 1712, 1714, and 1716 are measured while a SCK signal 1710 is measured at $R_{spi}$=400 kHz. In FIG. 17C, at least thee 8-PSK carriers 1720, 1722, and 1724 are measured while a SCK signal 1718 is measured at $R_{spi}$=800 kHz.

Figure 18A:
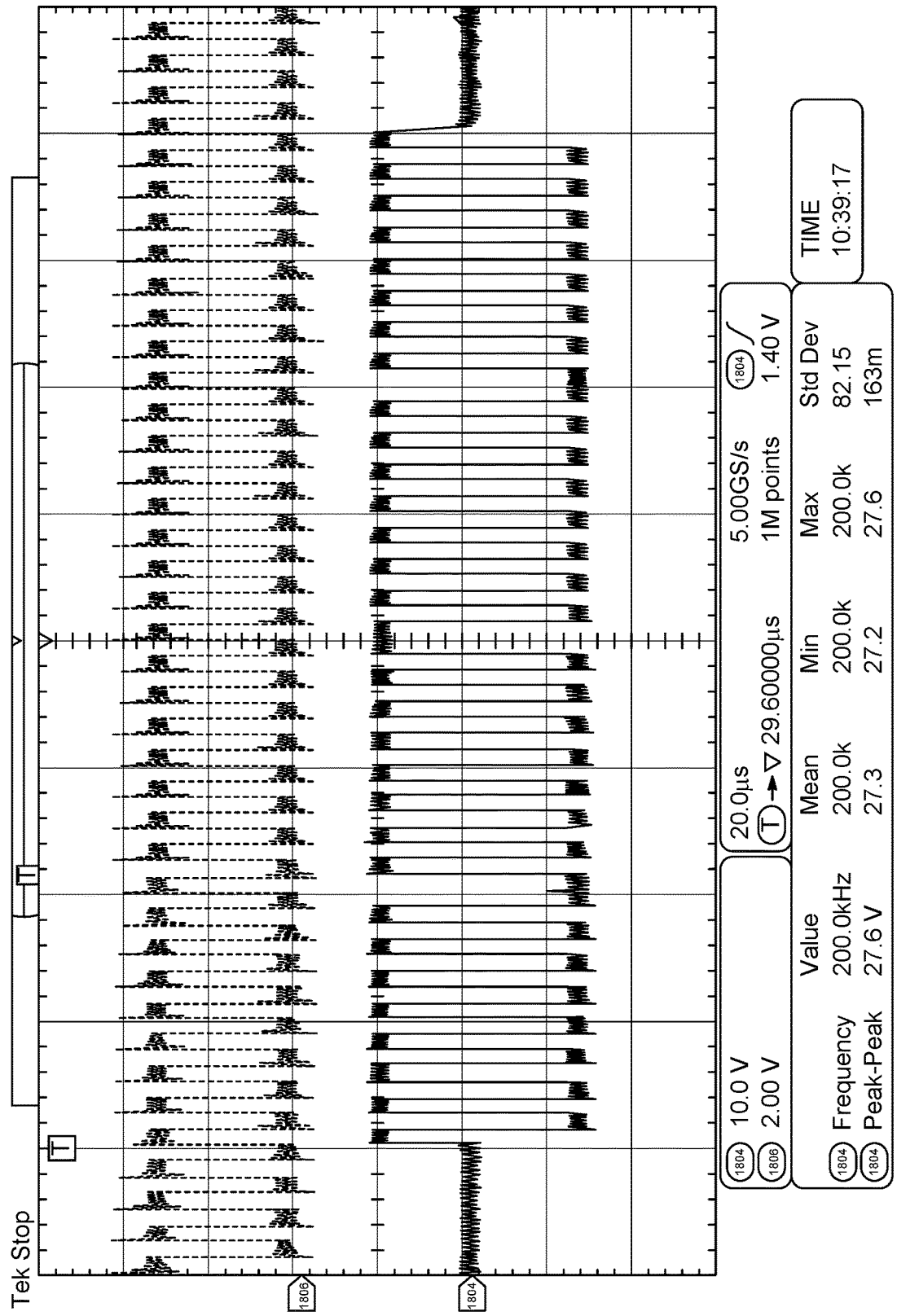
FIG. 18A and FIG. 18B illustrates example illustrations of a measurement of a SCK signal and four (4) symbols of a BPSK modulated signal and an OOK modulated signal transmitting binary.
Figure 18B:
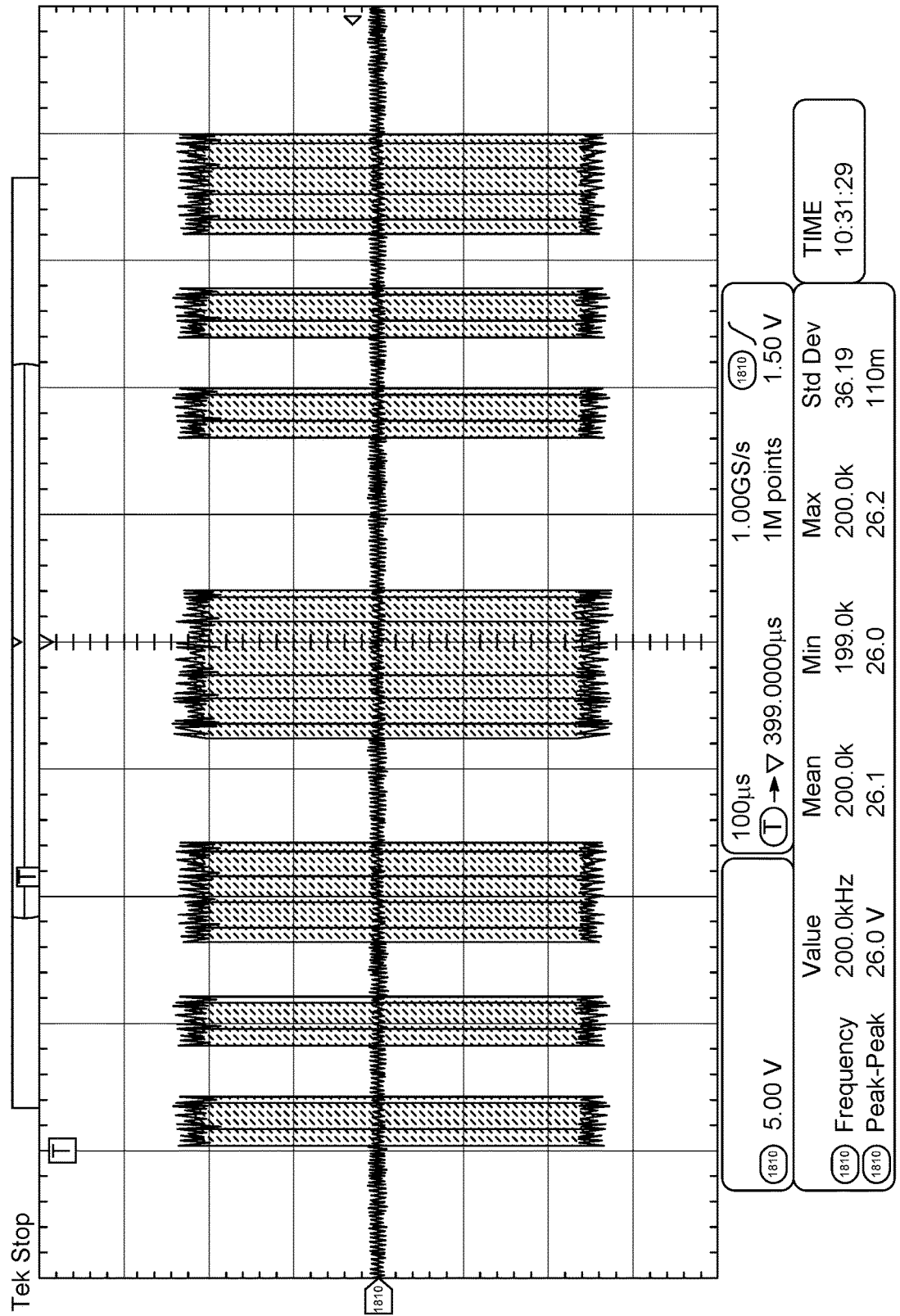

The oscilloscope used to capture the modulated signal as amplified by the transmitter power amplifier. The example of BPSK and OOK modulated signal on one transmit branch are shown in FIG. 18A and FIG. 18B. In FIG. 18A, a SCK signal and at least four (4) symbols of a BPSK modulated signal at a power amplifier (PA) output are measured. The carrier frequency was accurate to $10^{-5}$ and the BPSK symbol duration was accurately controlled. Since $f_c T_s$=8, each symbol contains 8 carrier cycles. In FIG. 18A, four symbols of a BPSK modulated signal 1804 and a SCK signal 1806 are measured. As a variation of BPSK modulation, OOK signals may be generated by setting the enable bit to zero for bit 0, thus disable the output of those bits on the circuits meant for BPSK modulation. An example of the passband OOK modulated transmit signal at the output of the power amplifier is shown in FIG. 18B, where an OOK modulated signal 1810 transmitting 20 binary bits 0b10101100111000101011 is measured.

Figure 19A:
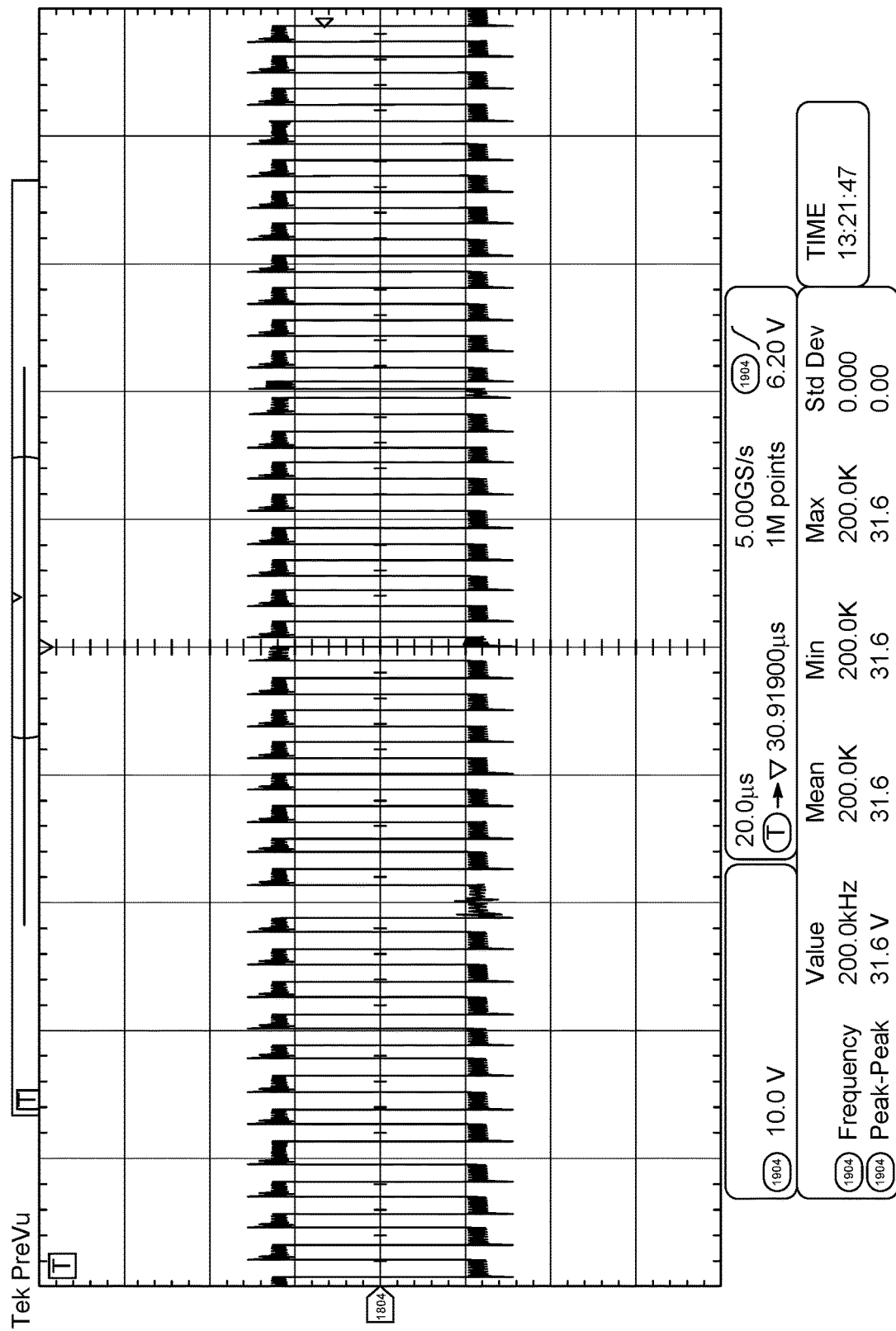
FIG. 19A and FIG. 19B are example illustrations of QPSK modulated signals with different carrier frequencies.
Figure 19B:
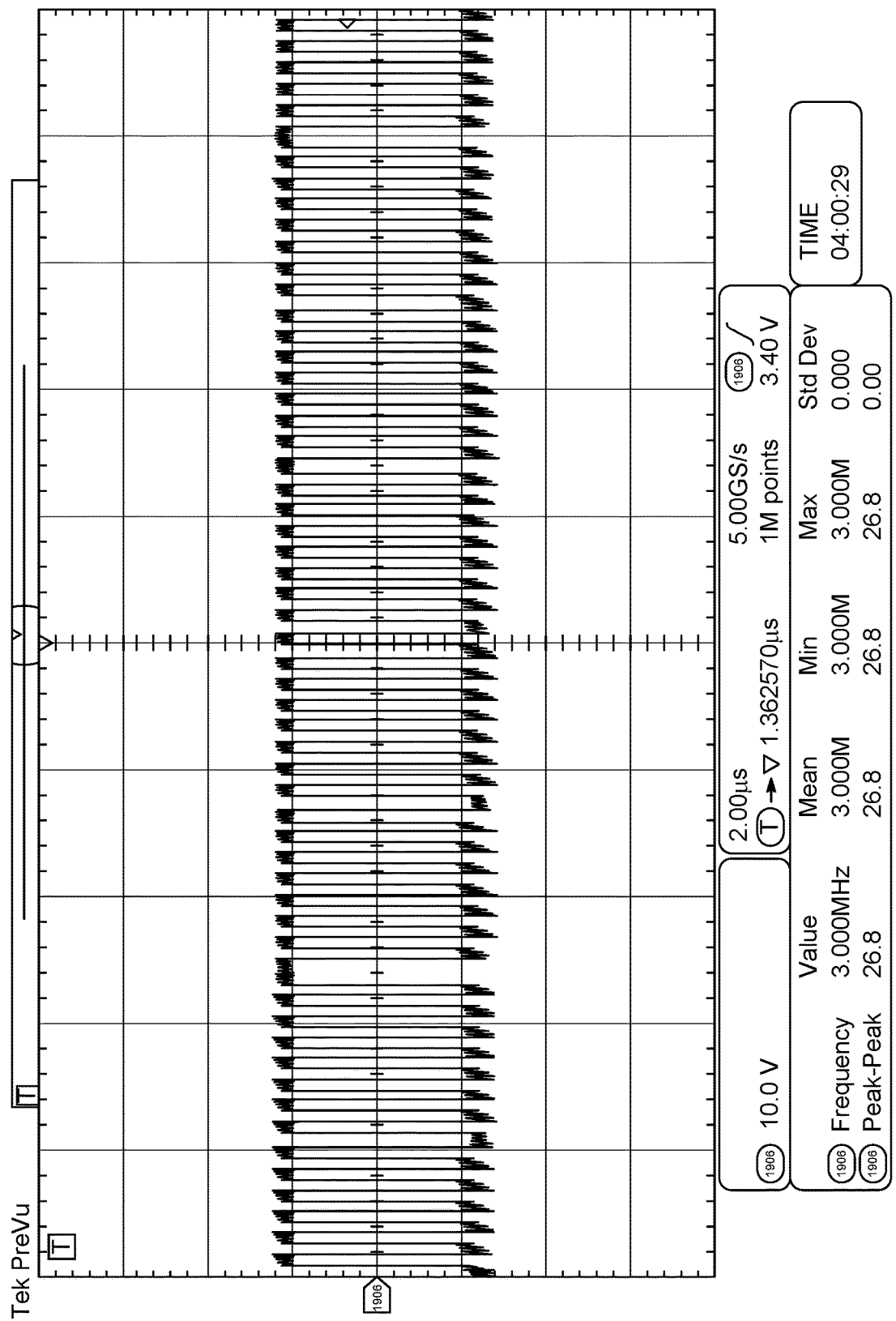

The QPSK modulated signal on one transmission branch at the PA output is shown in FIG. 19A and FIG. 19B. The carrier frequency of the QPSK modulated signal 1904 in FIG. 19A is set to $f_c$=200 kHz for the transmission test. In FIG. 19B, the carrier frequency of the QSPK modulated signal 1906 is set to the limit frequency of the designed PSK modulator $f_{c,limit}$=3 MHz. As shown, the waveform may have been distorted, while it still drove the transmitter.

Figure 20:
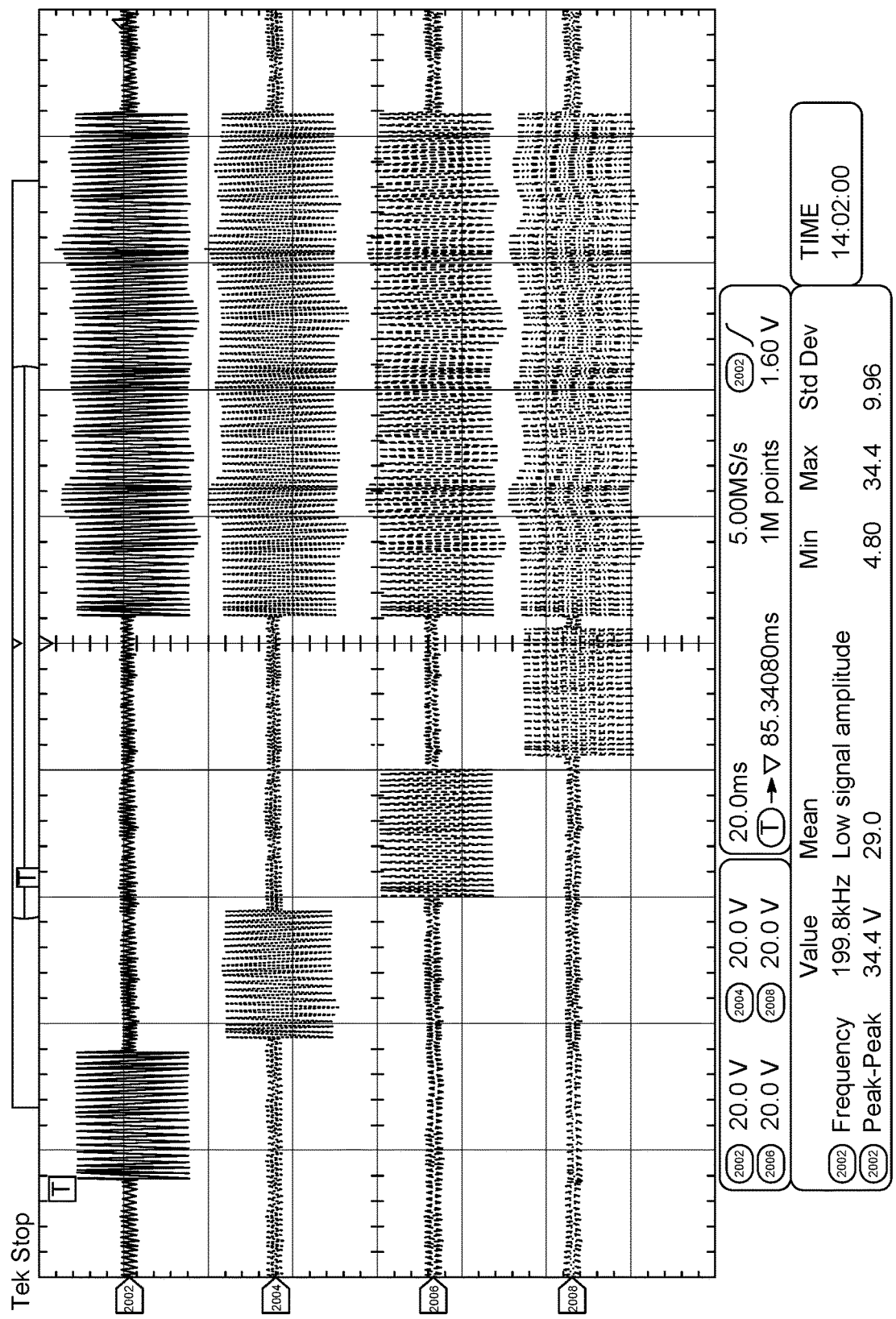
FIG. 20 is an example illustration of the signal on four branches for a BPSK MIMO transmission.

An example of a MIMO transmission packet is shown in FIG. 20, where each branch of the 4 branches 2002, 2004, 2006, 2008 contains a pilot block of 511 symbols, a gap, and a 3000-symbol payload. FIG. 20 illustrates examples of the signal on four branches for BPSK MIMO transmission. Each branch transmits a pilot sequentially, and transmits the payload together.

The pilot blocks of the different branches were transmitted at different time instances and were followed by a different length of gaps. Different branches transmit different payload symbols at the same time, resulting in 4 times of the original data rate. Some amplitude distortions presented in the transmitted signals were caused by circuit interference from power amplifiers and were low-pass filtered at the transducer outputs.

The transmitters were tested in a water tank with one branch transmitting with 200 kHz acoustic transducers and one receiver recording. The receiver was used in the water tank to verify the transmitted signals. The receiver includes a hydrophone, a low noise amplifier, an analog to digital converter, and a data storage platform. The passband received signals were post-processed to demodulate and detect the symbol streams. A pilot block of 511 m-sequence BPSK signal was used for carrier and symbol synchronization and the payload blocks were demodulated to complex symbols.

Figure 21A:
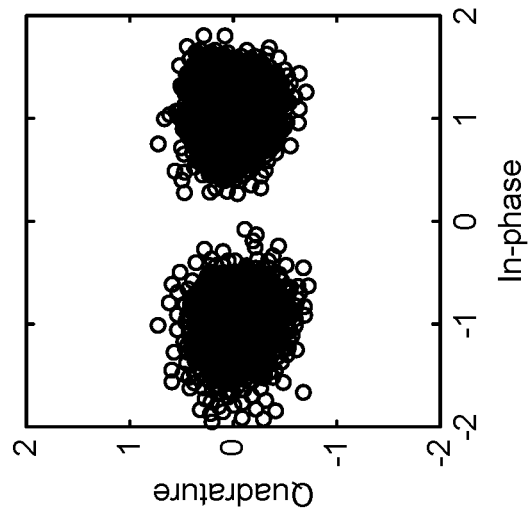
FIG. 21A, FIG. 21B, and FIG. 21C illustrate examples of constellation plots of received signals with 1 Tx and 1 Rx through a water tank channel.
Figure 21B:
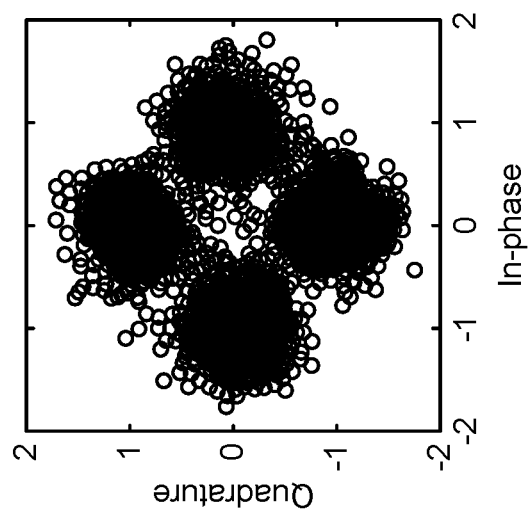
Figure 21C:
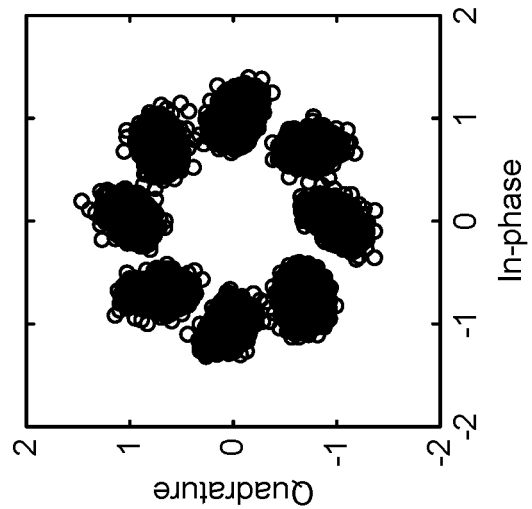

The payload signal constellation for BPSK, QPSK, and 8-PSK are shown in FIG. 21A, FIG. 21B, and FIG. 21C, respectively. With a mild channel condition, the symbols of the M-ary PSK are (e.g., clearly) centered at the designed locations. The slight rotations of the constellations in QPSK and 8PSK are due to the accuracy and stability of the system clocks in the transmitter and receiver circuits. With FEC coding and interleaving, the information bits are recovered (e.g., perfectly).

Without the capabilities, techniques, methods, and/or devices described herein, the skilled artisan would not appreciate how to utilize/modify/construct an acoustic transmission device to transmit, for example via MIMO and/or modulated phased carriers, at least some sensing data (e.g., video content, other sensing data, etc.), for example wirelessly and/or under water, among other mediums.

Figure 3:
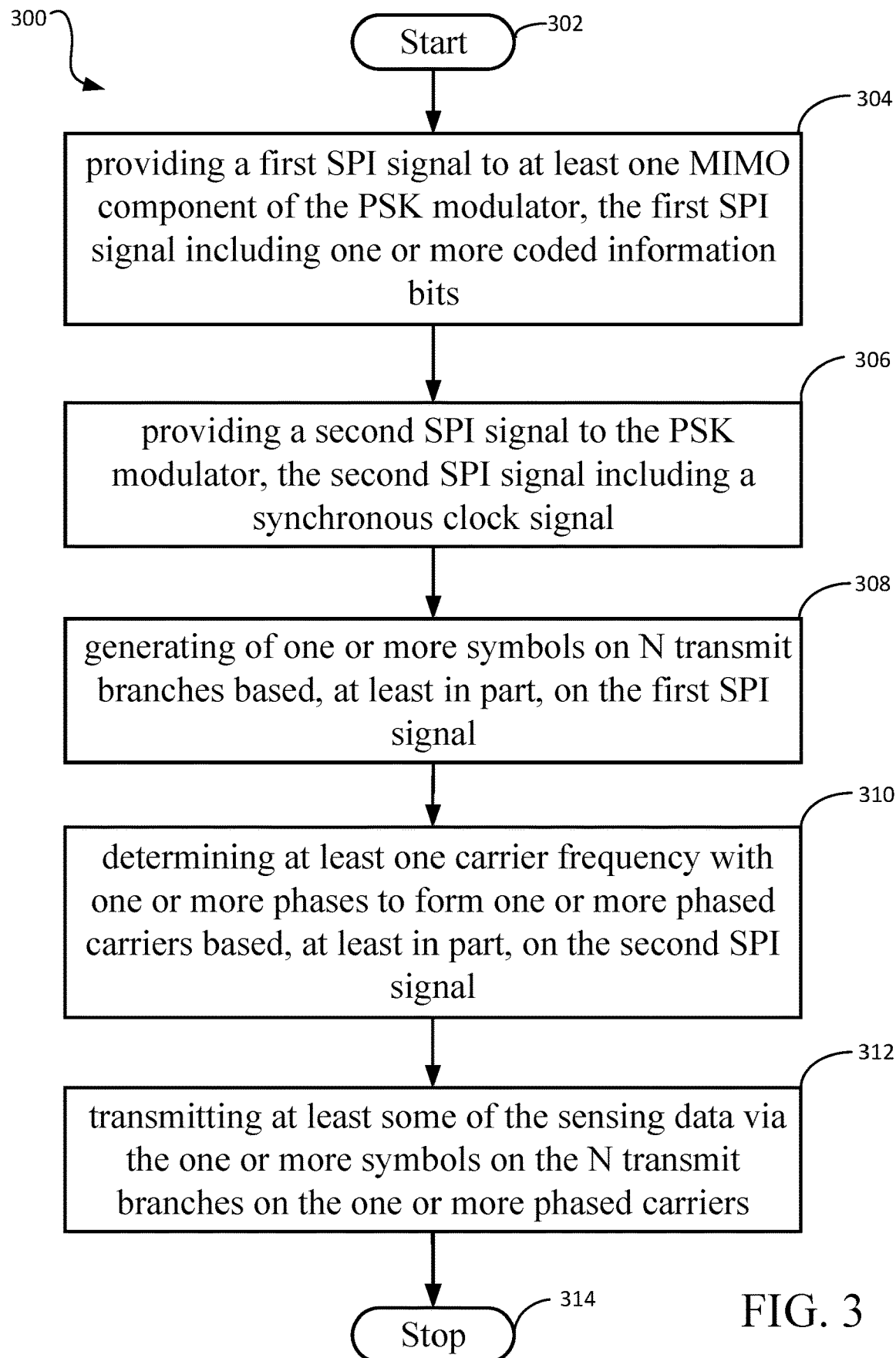
FIG. 3 is a flowchart of an example technique performed by an acoustic transmission device configured to communicate sensing data via one or more multiple-input multiple-output (MIMO) transmissions.

Referring to FIG. 3, a diagram 300 illustrates an example technique that may be performed by an acoustic transmission device configured to communicate sensing data (e.g., video content, other sensing data, etc.) via one or more multiple-input multiple-output (MIMO) transmissions. The acoustic transmission device may comprise a memory, a serial peripheral interface (SPI), and/or a phase shifting key (PSK) modulator. For example, the acoustic transmission device may be and/or include any of the PSK modulator circuits/devices and/or controllers described herein. The acoustic transmission device may be in communication with at least one camera device, other video streaming device, and/or other sensing device. At 302, the process/technique may start or restart.

At 304, the acoustic transmission device may provide a first SPI signal to at least one MIMO component of the PSK modulator. The first SPI signal may include one or more coded information bits. At 306, the device may provide a second SPI signal to the PSK modulator. The second SPI signal may include a synchronous clock signal.

At 308, the device may generate of one or more symbols on N (e.g., N as described herein) transmit branches based, at least in part, on the first SPI signal. At 310, the device may determine at least one carrier frequency with one or more phases to form one or more phased carriers based, at least in part, on the second SPI signal.

At 312, the device may transmit at least some of the sensing data via the one or more symbols on the N transmit branches on the one or more phased carriers. At 314 the process/technique may stop or restart.

Figure 4:
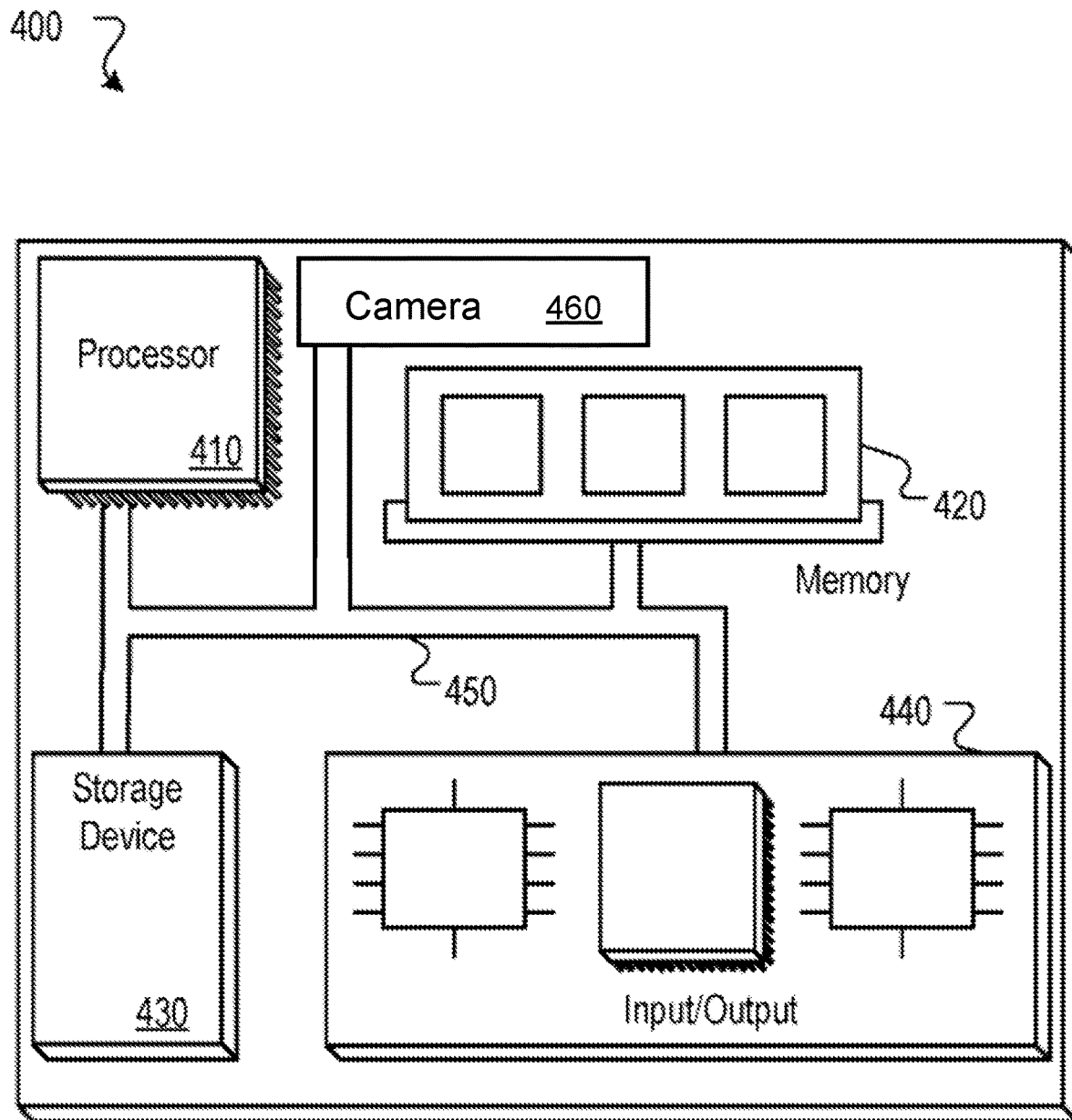
FIG. 4 is a block diagram of a hardware configuration of an example device that may control one or more parts of the circuits and/or devices described herein.

FIG. 4 is a block diagram of a hardware configuration of an example device that may function as a process control device/logic controller, such as the aforementioned GPIO, SoC, MCU, CPU, and/or FPGA, and/or other IoT capable computation/controller devices, for example. The hardware configuration 400 may be operable to facilitate delivery of information from an internal server of a device. The hardware configuration 400 can include a processor 410, a memory 420, a storage device 430, and/or an input/output device 440. One or more of the components 410, 420, 430, and 440 can, for example, be interconnected using a system bus 450. The processor 410 can process instructions for execution within the hardware configuration 400. The processor 410 can be a single-threaded processor or the processor 410 can be a multi-threaded processor. The processor 410 can be capable of processing instructions stored in the memory 420 and/or on the storage device 430.

The memory 420 can store information within the hardware configuration 400. The memory 420 can be a computer-readable medium (CRM), for example, a non-transitory CRM. The memory 420 can be a volatile memory unit, and/or can be a non-volatile memory unit.

The storage device 430 can be capable of providing mass storage for the hardware configuration 400. The storage device 430 can be a computer-readable medium (CRM), for example, a non-transitory CRM. The storage device 430 can, for example, include a hard disk device, an optical disk device, flash memory and/or some other large capacity storage device. The storage device 430 can be a device external to the hardware configuration 400.

The input/output device 440 may provide input/output operations for the hardware configuration 400. The input/output device 440 (e.g., a transceiver device) can include one or more of a network interface device (e.g., an Ethernet card), a serial communication device (e.g., an RS-232 port), one or more universal serial bus (USB) interfaces (e.g., a USB 2.0 port) and/or a wireless interface device (e.g., an 802.11 card). The input/output device can include driver devices configured to send communications to, and/or receive communications from one or more networks. The input/output device 400 may be in communication with one or more input/output modules (not shown) that may be proximate to the hardware configuration 400 and/or may be remote from the hardware configuration 400. The one or more output modules may provide input/output functionality in the digital signal form, discrete signal form, TTL form, analog signal form, serial communication protocol, fieldbus protocol communication and/or other open or proprietary communication protocol, and/or the like.

The camera device 460 may provide digital video input/output capability for the hardware configuration 400. The camera device 460 may communicate with any of the elements of the hardware configuration 400, perhaps for example via system bus 450. The camera device 460 may capture digital images and/or may scan images of various kinds, such as Universal Product Code (UPC) codes and/or Quick Response (QR) codes, for example, among other images as described herein. In one or more scenarios, the camera device 460 may be the same and/or substantially similar to any of the other camera devices described herein.

The camera device 460 may include at least one microphone device and/or at least one speaker device. The input/output of the camera device 460 may include audio signals/packets/components, perhaps for example separate/separable from, or in some (e.g., separable) combination with, the video signals/packets/components the camera device 460.

The camera device 460 may also detect the presence of one or more people that may be proximate to the camera device 460 and/or may be in the same general space (e.g., the same room) as the camera device 460. The camera device 460 may gauge a general activity level (e.g., high activity, medium activity, and/or low activity) of one or more people that may be detected by the camera device 460. The camera device 460 may detect one or more general characteristics (e.g., height, body shape, skin color, pulse, heart rate, breathing count, etc.) of the one or more people detected by the camera device 460. The camera device 460 may be configured to recognize one or more specific people, for example.

The camera device 460 may be in wired and/or wireless communication with the hardware configuration 400. In one or more scenarios, the camera device 460 may be external to the hardware configuration 400. In one or more scenarios, the camera device 460 may be internal to the hardware configuration.

The subject matter of this disclosure, and components thereof, can be realized by instructions that upon execution cause one or more processing devices to carry out the processes and/or functions described herein. Such instructions can, for example, comprise interpreted instructions, such as script instructions, e.g., JavaScript or ECMAScript instructions, or executable code, and/or other instructions stored in a computer readable medium.

Implementations of the subject matter and/or the functional operations described in this specification and/or the accompanying figures can be provided in digital electronic circuitry, in computer software, firmware, and/or hardware, including the structures disclosed in this specification and their structural equivalents, and/or in combinations of one or more of them. The subject matter described in this specification can be implemented as one or more computer program products, e.g., one or more modules of computer program instructions encoded on a tangible program carrier for execution by, and/or to control the operation of, data processing apparatus.

A computer program (also known as a program, software, software application, script, or code) can be written in any form of programming language, including compiled or interpreted languages, and/or declarative or procedural languages. It can be deployed in any form, including as a stand-alone program or as a module, component, subroutine, and/or other unit suitable for use in a computing environment. A computer program may or might not correspond to a file in a file system. A program can be stored in a portion of a file that holds other programs and/or data (e.g., one or more scripts stored in a markup language document), in a single file dedicated to the program in question, and/or in multiple coordinated files (e.g., files that store one or more modules, sub programs, or portions of code). A computer program can be deployed to be executed on one computer or on multiple computers that may be located at one site or distributed across multiple sites and/or interconnected by a communication network.

The processes and/or logic flows described in this specification and/or in the accompanying figures may be performed by one or more programmable processors executing one or more computer programs to perform functions by operating on input data and/or generating output, thereby tying the process to a particular machine (e.g., a machine programmed to perform the processes described herein). The processes and/or logic flows can also be performed by, and apparatus can also be implemented as, special purpose logic circuitry, e.g., an FPGA (field programmable gate array) and/or an ASIC (application specific integrated circuit).

Computer readable media suitable for storing computer program instructions and/or data may include all forms of non-volatile memory, media and memory devices, including by way of example semiconductor memory devices (e.g., EPROM, EEPROM, and/or flash memory devices); magnetic disks (e.g., internal hard disks or removable disks); magneto optical disks; and/or CD ROM and DVD ROM disks. The processor and/or the memory can be supplemented by, or incorporated in, special purpose logic circuitry.

While this specification and the accompanying figures contain many specific implementation details, these should not be construed as limitations on the scope of any invention and/or of what may be claimed, but rather as descriptions of features that may be specific to described example implementations. Certain features that are described in this specification in the context of separate implementations can also be implemented in combination in perhaps one implementation. Various features that are described in the context of perhaps one implementation can also be implemented in multiple combinations separately or in any suitable sub-combination. Although features may be described above as acting in certain combinations and/or perhaps even (e.g., initially) claimed as such, one or more features from a claimed combination can in some cases be excised from the combination. The claimed combination may be directed to a sub-combination and/or variation of a sub-combination.

While operations may be depicted in the drawings in an order, this should not be understood as requiring that such operations be performed in the particular order shown and/or in sequential order, and/or that all illustrated operations be performed, to achieve useful outcomes. The described program components and/or systems can generally be integrated together in a single software product and/or packaged into multiple software products.

Examples of the subject matter described in this specification have been described. The actions recited in the claims can be performed in a different order and still achieve useful outcomes, unless expressly noted otherwise. For example, the processes depicted in the accompanying figures do not require the particular order shown, and/or sequential order, to achieve useful outcomes. Multi-tasking and parallel processing may be advantageous in one or more scenarios.

While the present disclosure has been illustrated and described in detail in the drawings and foregoing description, the same is to be considered as illustrative and not restrictive in character, it being understood that only certain examples have been shown and described, and that all changes and modifications that come within the spirit of the present disclosure are desired to be protected.

What is claimed is:

1. An acoustic transmission device configured to communicate sensing data via one or more multiple-input multiple-output (MIMO) transmissions, the acoustic transmission device comprising:
   a memory;
   a serial peripheral interface (SPI);
   a single carrier modulator (SCM); and
   a processor, the processor configured at least to:
      provide a first SPI signal to at least one MIMO component of the SCM, the first SPI signal including one or more coded information bits;
      provide a second SPI signal to the SCM, the second SPI signal including a synchronous clock signal;
      control a generation of one or more symbols on N transmit branches based, at least in part, on the first SPI signal;
      control a determination of at least one carrier frequency with one or more phases to form one or more phased carriers based, at least in part, on the second SPI signal; and
      control a transmission of at least some of the sensing data via the one or more symbols on the N transmit branches on the one or more phased carriers.

2. The device of claim 1, wherein the SCM is at least one of: an M-ary PSK (MPSK) modulator, an On-Off Keying (OOK) modulator, or a Quadrature Amplitude Modulator (QAM), the processor is further configured to:
   provide a third SPI signal to the SCM, the third SPI signal providing an indication of the transmission completion, the third SPI signal being a Chip/Slave Select (SS) signal.

3. The device of claim 1, wherein the SCM further comprises a phased carrier generator, wherein the processor is further configured such that the second SPI signal is provided to the phased carrier generator, the phased carrier generator being configured to form the one or more phased carriers.

4. The device of claim 1, wherein the SCM further comprises a carrier modulator, the processor being further configured to:
   provide the one or more phased carriers to the carrier modulator;
   provide the one or more symbols on the N transmit branches to the carrier modulator, the carrier modulator being configured to:
   select one or more of the one or more phased carriers; and
   generate a modulated signal representing the one or more symbols on the N transmit branches on the selected one or more phased carriers.

5. The device of claim 1, wherein the at least one MIMO component of the SCM is a MIMO Bit-to-Symbol (Bit2sym) converter, the processor being further configured to:
   provide the first SPI signal to the MIMO Bit2sym converter, the MIMO Bit2Sym converter being configured to multiplex the coded information bits into the N transmit branches.

6. The device of claim 5, wherein the MIMO Bit2Sym converter is further configured such that each of N transmit branches includes q bits and a (q+1)th bit, the MIMO Bit2Sym converter being further configured to at least one of: turn on, or turn off, a respective N transmit branch based on the (q+1)th bit.

7. The device of claim 1, wherein the processor is further configured to:
provide a reset (RST) signal to at least one of: a MIMO Bit2Sym converter, a phased carrier generator, or an SCM binary counter, the MIMO Bit2Sym converter being configured to clear itself upon receipt of the RST signal, the phased carrier generator being configured to clear itself upon receipt of the RST signal, and the SCM being configured to reset the binary counter upon receipt of the RST signal.

8. The device of claim 1, wherein the SCM is at least one of: an OOK modulator, a BPSK modulator, a QPSK modulator, an 8-PSK modulator, an MPSK modulator, or a QAM.

9. The device of claim 1, wherein the first SPI signal is a Master-Out-Slave-In (MOSI) bit stream, and the second SPI signal is a serial clock signal.

10. The device of claim 1, further comprising a wireless transmitter, wherein the processor is further configured to send the modulated signal representing the one or more symbols on the N transmit branches on the one or more phased carriers via the wireless transmitter.

11. The device of claim 1, wherein the processor is further configured to:
receive at least one of: a video stream from a camera, or other sensing data;
process at least a part of at least one of: the video stream, or the other sensing data, to generate the one or more coded information bits; and
generate the first SPI signal to convey the one or more coded information bits.

12. A single carrier modulator (SCM) device, the SCM including one or more multiple-input multiple-output (MIMO) components, the SCM being in communication with a serial peripheral interface (SPI), the SCM comprising:
a MIMO Bit-to-Symbol (Bit2sym) converter configured at least to:
receive a first SPI signal, the first signal including one or more coded information bits; and
generate one or more symbols on N transmit branches based, at least in part, on the first SPI signal;
a phased carrier generator configured at least to:
receive a second SPI signal, the second signal including a synchronous clock signal; and
determine at least one carrier frequency with one or more phases and/or one or more amplitudes to form one or more phased carriers based, at least in part, on the second SPI signal; and
a carrier modulator configured at least to:
receive the one or more symbols on the N transmit branches from the MIMO Bit2Sym converter;
receive the one or more phased carriers from the carrier modulator; and
send at least the one or more symbols on the N transmit branches on the one or more phased carriers.

13. The device of claim 12, wherein carrier modulator is further configured to:
select one or more of the one or more phased carriers; and
generate a modulated signal representing the one or more symbols on the N transmit branches on the selected one or more phased carriers.

14. The device of claim 12, wherein the MIMO Bit2Sym converter is further configured to multiplex the coded information bits into the N transmit branches.

15. The device of claim 14, wherein the MIMO Bit2Sym converter is further configured such that each of N transmit branches includes q bits and a (q+1)th bit, the MIMO Bit2Sym converter being further configured to at least one of: turn on, or turn off, a respective N transmit branch based on the (q+1)th bit.

16. The device of claim 12, wherein the SCM is at least one of: an M-ary PSK (MPSK) modulator, an OOK modulator, or a QAM, the SCM being further configured to:
receive a third SPI signal, the third SPI signal providing an indication of a transmission completion, the third SPI signal being a Chip/Slave Select (SS) signal, the first SPI signal being a Master-Out-Slave-In (MOSI) bit stream, and the second SPI signal being a serial clock signal.

17. A method performed by an acoustic transmission device configured to communicate sensing data via one or more multiple-input multiple-output (MIMO) transmissions, the acoustic transmission device comprising: a memory, a serial peripheral interface (SPI), and a single carrier modulator (SCM), the method comprising:
providing a first SPI signal to at least one MIMO component of the SCM, the first SPI signal including one or more coded information bits;
providing a second SPI signal to the SCM, the second SPI signal including a synchronous clock signal;
generating one or more symbols on N transmit branches based, at least in part, on the first SPI signal;
determining at least one carrier frequency with one or more phases to form one or more phased carriers based, at least in part, on the second SPI signal; and
transmitting at least some of the sensing data via the one or more symbols on the N transmit branches on the one or more phased carriers.

18. The method of claim 17, further comprising: providing a third SPI signal to the SCM, the third SPI signal providing an indication of a transmission completion, the third SPI signal being a Chip/Slave Select (SS) signal, the first SPI signal being a Master-Out-Slave-In (MOSI) bit stream, and the second SPI signal being a serial clock signal.

19. The method claim 17, wherein the SCM further comprises a carrier modulator, the method further comprising:
providing the one or more phased carriers to the carrier modulator;
providing the one or more symbols on the N transmit branches to the carrier modulator;
selecting one or more of the one or more phased carriers; and
generating a modulated signal representing the one or more symbols on the N transmit branches on the selected one or more phased carriers.

20. The method of claim 17, wherein the device is in communication with at least one of: a camera, or another sensing device, the method further comprising:
receiving at least one of: a video stream from a camera, or other sensing data from the other sensing device;
processing at least a part of at least one of: the video stream, or the other sensing data, to generate the one or more coded information bits; and
generating the first SPI signal to convey the one or more coded information bits.

* * * * *